(12) United States Patent
Chase

(10) Patent No.: US 6,331,068 B1
(45) Date of Patent: *Dec. 18, 2001

(54) FLEXIBLE LAMP MOUNTING

(75) Inventor: Lee A. Chase, Grand Rapids, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,046

(22) Filed: Jan. 25, 2000

Related U.S. Application Data

(63) Continuation-in-part of application No. 09/252,437, filed on Feb. 18, 1999, now Pat. No. 6,900,030.

(51) Int. Cl.$^7$ ...................................................... F21V 7/18
(52) U.S. Cl. ........................... 362/549; 362/369; 362/507
(58) Field of Search .................................... 362/549, 306, 362/369, 390, 505, 546, 450; 293/117, 120, 132, 138

(56) References Cited

U.S. PATENT DOCUMENTS

| D. 343,605 | 1/1994 | Meryman . | |
|---|---|---|---|
| 1,572,024 | 2/1926 | MacInnes | 362/505 |
| 1,577,937 | 3/1926 | Slusser . | |
| 1,993,675 | 3/1935 | Long . | |
| 2,613,099 | 10/1952 | Arbib . | |
| 3,088,022 | 4/1963 | Schmidt | 362/505 |
| 3,196,265 | 7/1965 | Schneider | 362/505 |
| 3,457,397 | 7/1969 | Tindall | 362/505 |

FOREIGN PATENT DOCUMENTS

| 30427 | 2/1885 | (EP) . |
| 2407451 A1 | 3/1975 | (EP) . |
| 3525198 A1 | 1/1987 | (EP) . |
| 3802 104 A1 | 8/1989 | (EP) . |
| 4142582 A1 | 6/1993 | (EP) . |
| 0 422 406 A1 | 4/1999 | (EP) . |
| 57-178947 | 11/1982 | (JP) . |
| 61-263846 | 11/1986 | (JP) . |
| 3-209738 | 9/1991 | (JP) . |
| 5-85287 | 6/1993 | (JP) . |
| 6-171445 | 6/1994 | (JP) . |

*Primary Examiner*—Alan Cariaso
*Assistant Examiner*—Hargobind S. Sawhney
(74) *Attorney, Agent, or Firm*—Vanophem & Vanophem, P.C.

(57) ABSTRACT

A lamp system for a vehicle having an impact-absorbing bumper that is designed to be mounted substantially flush with the surrounding vehicle body panels and bumper, and capable of deflecting with the stroke of the impact-absorbing bumper during impact to obviate the need for the lamp to pivot about an anchor point or to be mechanically displaceable with additional hardware. The lamp system is preferably formed from resilient, impact-resistant material, with a deformable resilient deflection member selectively located between the lens and the housing, between the inner lens and the outer lens in a dual lens system, or between the housing and the body of the vehicle or a member attached thereto. Further, the resilient deflection member may be the lens itself. The material for the resilient deflection member must have a yield strength that is adequate to sustain a predetermined degree of deformation, corresponding to the amount of deflection required to deflect with the bumper stroke. The resilient deflection member permits the lens or other components of the headlamp assembly to move upon impact without damage to itself or any other surrounding assembly components, acts as a seal between the lens and the housing so that contaminants do not degrade the function of the lamp system, and may be used as a styling element to enhance the aesthetic effect of the vehicle. The lamp system achieves an aerodynamic look, and allows stylists complete freedom to create convex-shaped front- or rear-end systems with each vehicle design.

21 Claims, 19 Drawing Sheets

U.S. PATENT DOCUMENTS

| | | | |
|---|---|---|---|
| 4,658,335 | 4/1987 | Culler | 362/549 |
| 4,667,995 | 5/1987 | Wilkins | 362/505 |
| 4,758,034 | 7/1988 | Ghezzi et al. | 293/132 |
| 4,786,093 | 11/1988 | Nishi | 293/120 |
| 4,920,460 | 4/1990 | Mori | 362/496 |
| 4,931,312 * | 6/1990 | Kawakami | 362/547 |
| 4,974,125 | 11/1990 | McGehee | 362/505 |
| 5,060,122 | 10/1991 | Miyoshi | 362/505 |
| 5,205,507 | 4/1993 | Chase | 242/586.3 |
| 5,243,503 | 9/1993 | Hu | 362/505 |
| 5,267,128 | 11/1993 | Shamir et al. | 362/505 |
| 5,288,117 | 2/1994 | Vogelgesang | 293/117 |
| 5,364,142 | 11/1994 | Coiner | 293/117 |
| 5,373,425 | 12/1994 | Shirai | 362/461 |
| 5,388,037 | 2/1995 | Umeda et al. | 362/520 |
| 5,390,087 | 2/1995 | Daumeller et al. | 362/462 |
| 5,398,172 | 3/1995 | Kojima et al. | 362/546 |
| 5,428,510 | 6/1995 | Shirai et al. | 362/462 |
| 5,448,454 | 9/1995 | Nonaka | 362/546 |
| 5,497,301 | 3/1996 | McMahan et al. | 362/505 |
| 5,497,303 | 3/1996 | Decinti et al. | 362/524 |
| 5,519,588 | 5/1996 | Sobeck et al. | 362/518 |
| 5,556,190 | 9/1996 | Saijo | 362/519 |
| 5,582,475 | 12/1996 | Yagi | 362/549 |
| 5,607,218 | 3/1997 | Choji | 362/548 |
| 5,607,221 | 3/1997 | Justus | 362/485 |
| 5,651,604 * | 7/1997 | Dobler | 362/507 |
| 5,688,043 * | 11/1997 | Watanabe | 362/297 |
| 5,702,148 * | 12/1997 | Vaughan | 296/146.9 |
| 6,059,433 * | 5/2000 | Otaka | 362/507 |
| 6,190,030 * | 2/2001 | Chase | 362/549 |

* cited by examiner

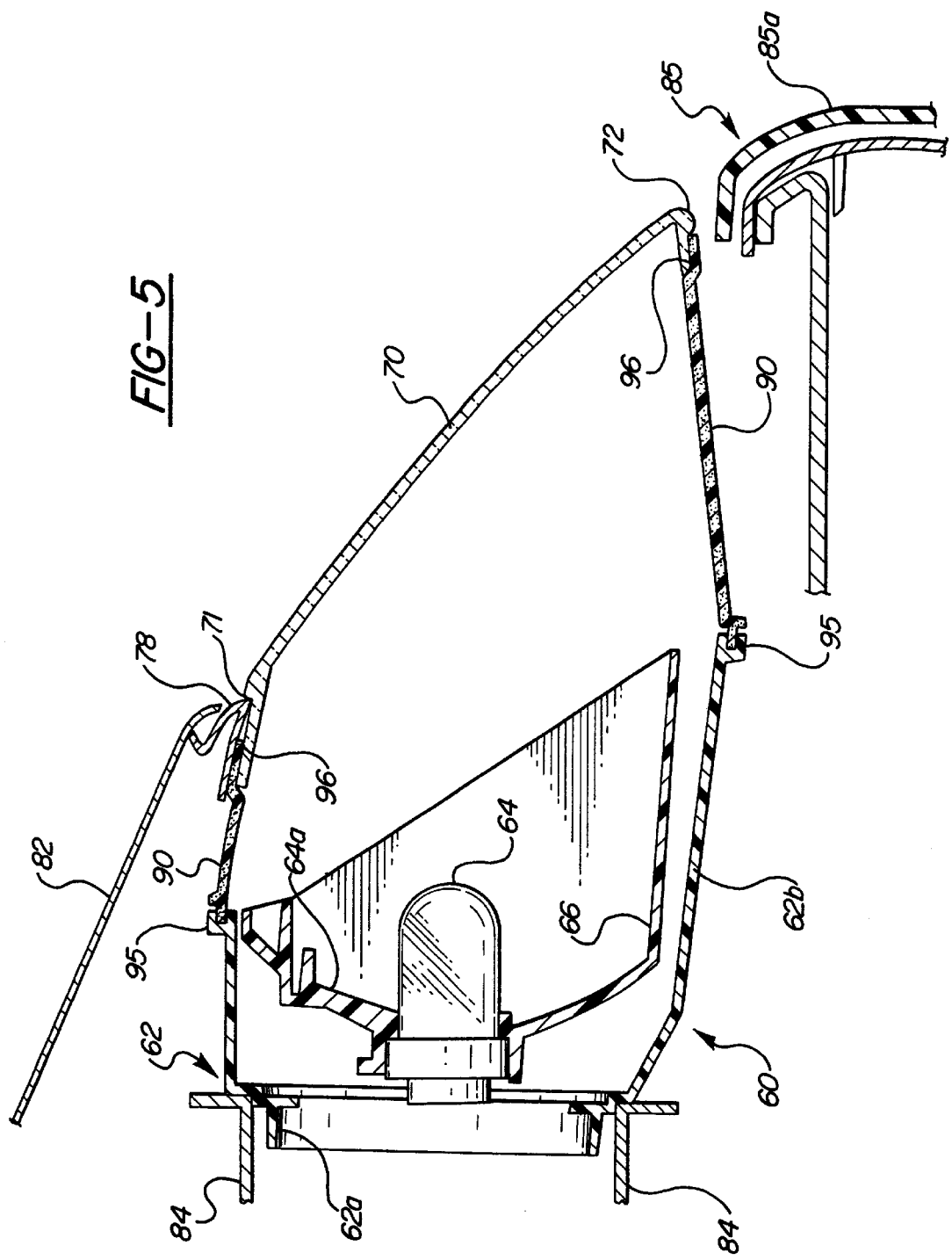

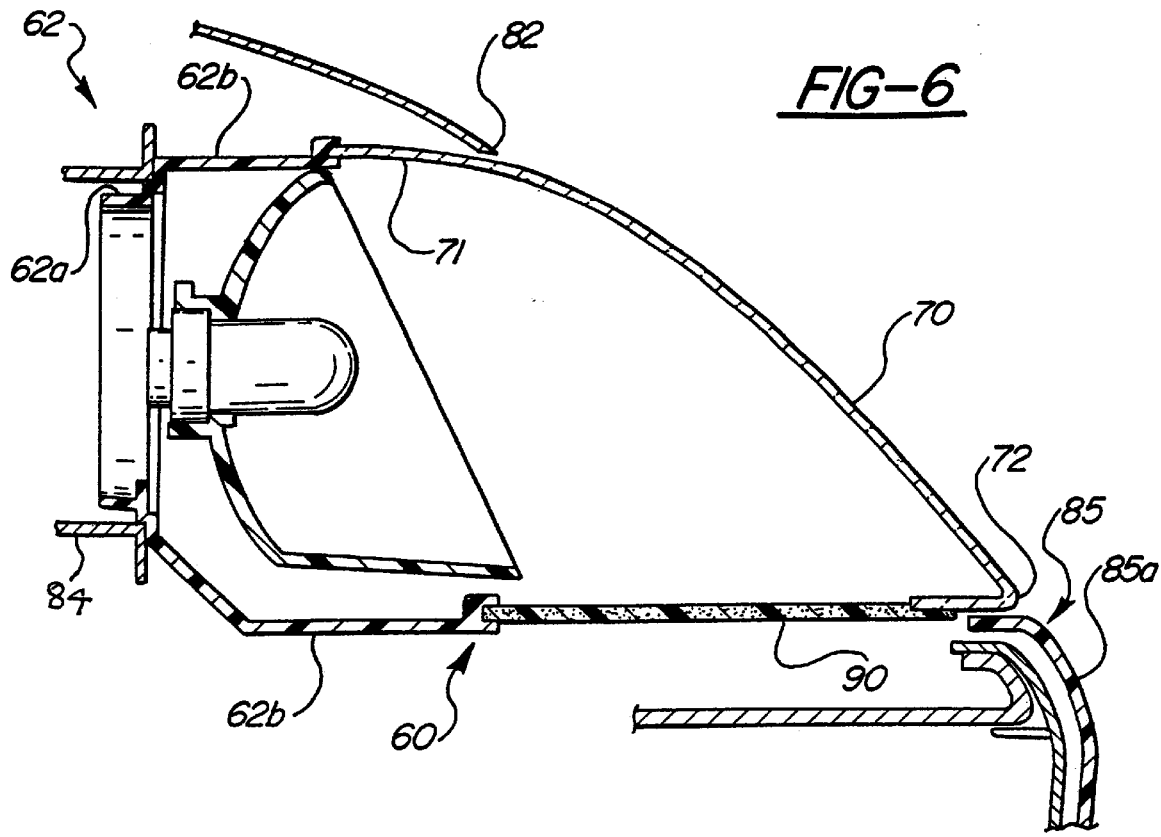
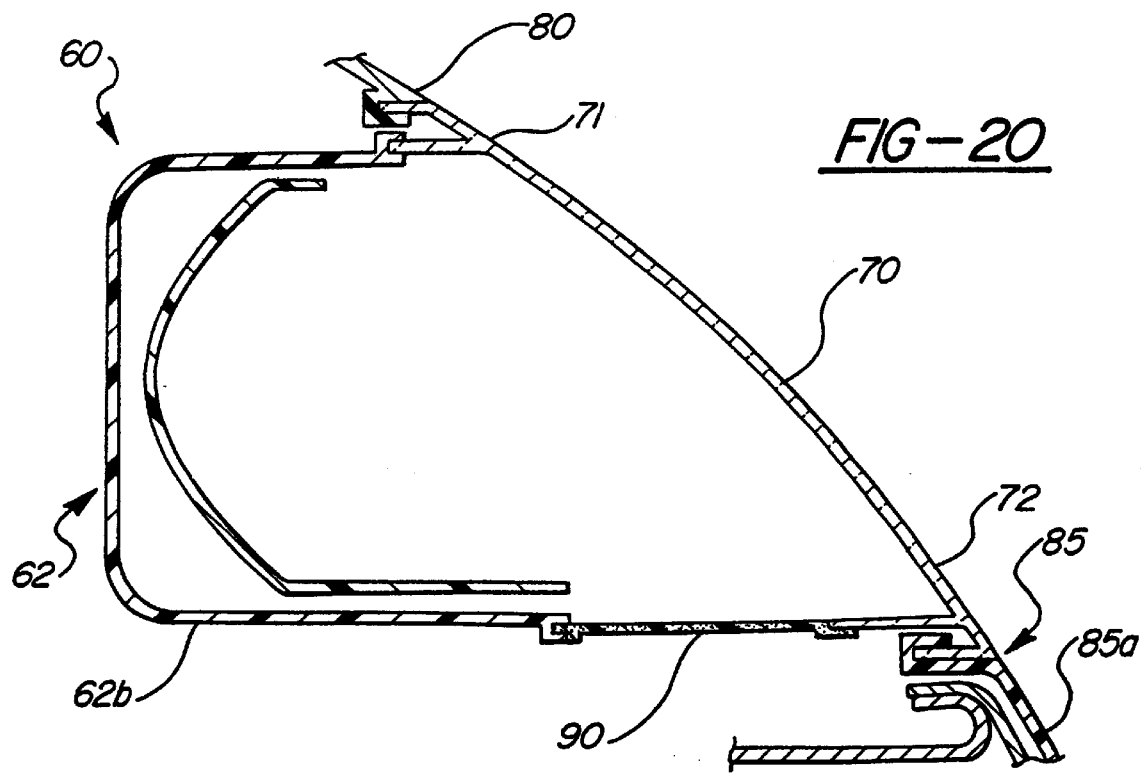

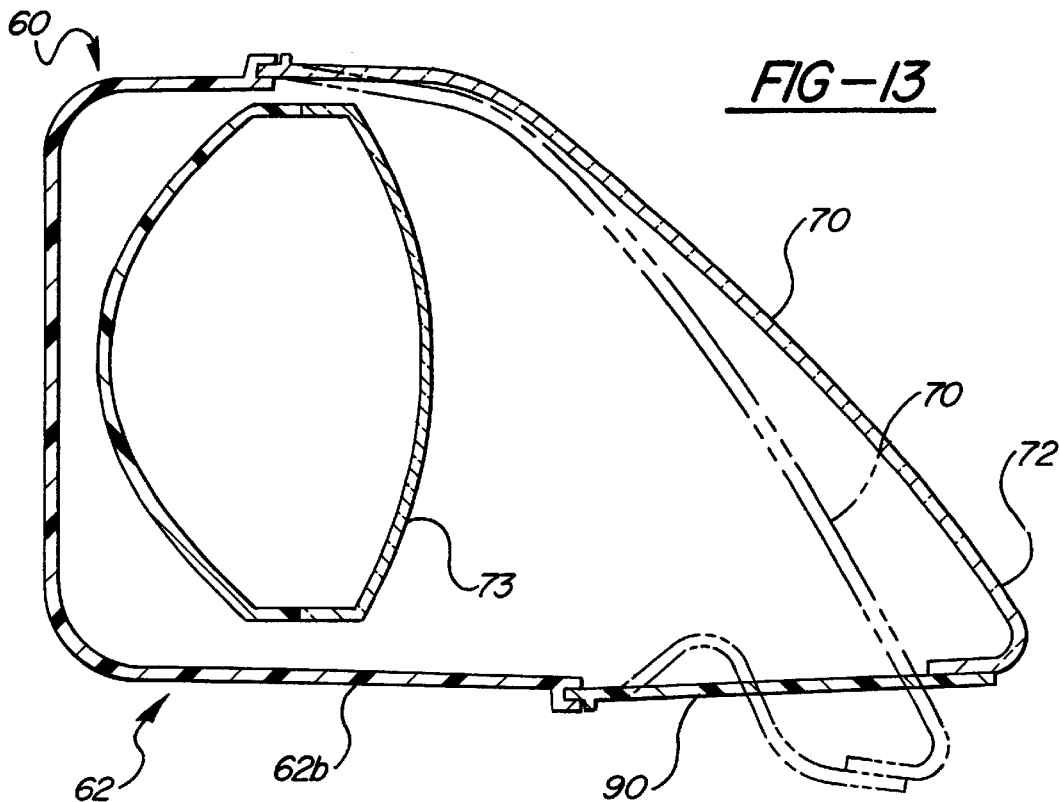
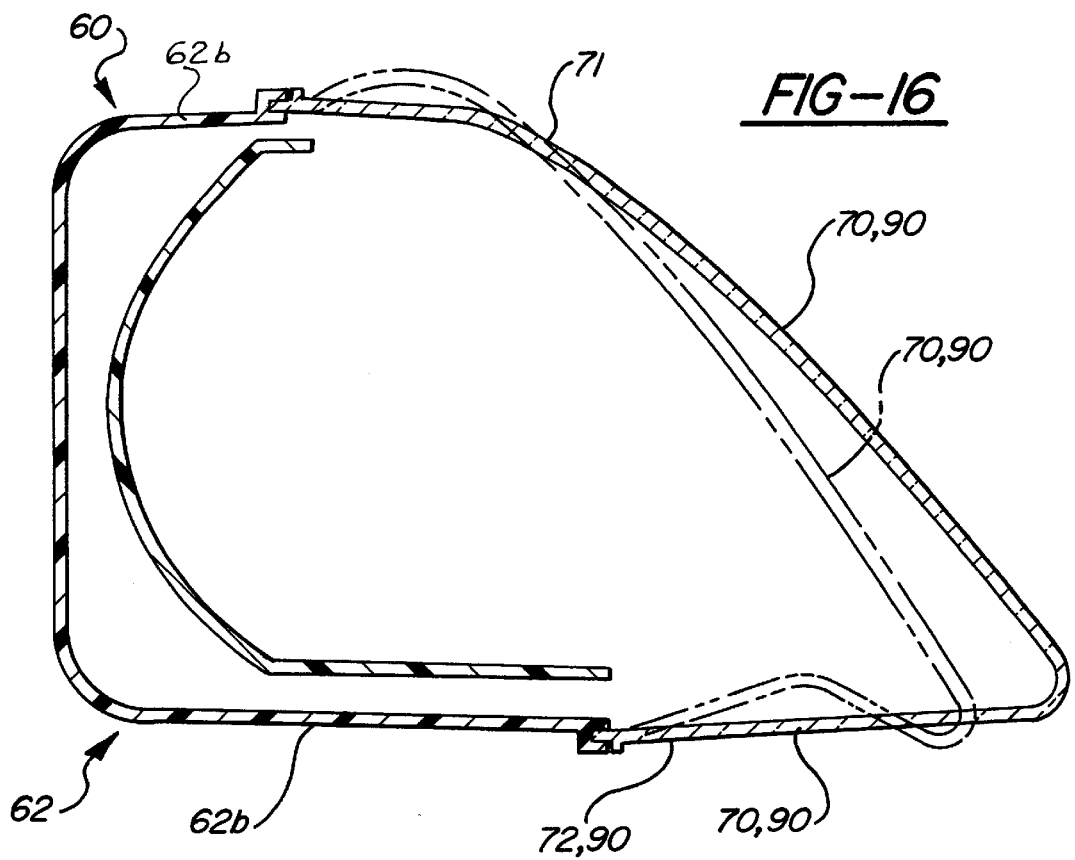

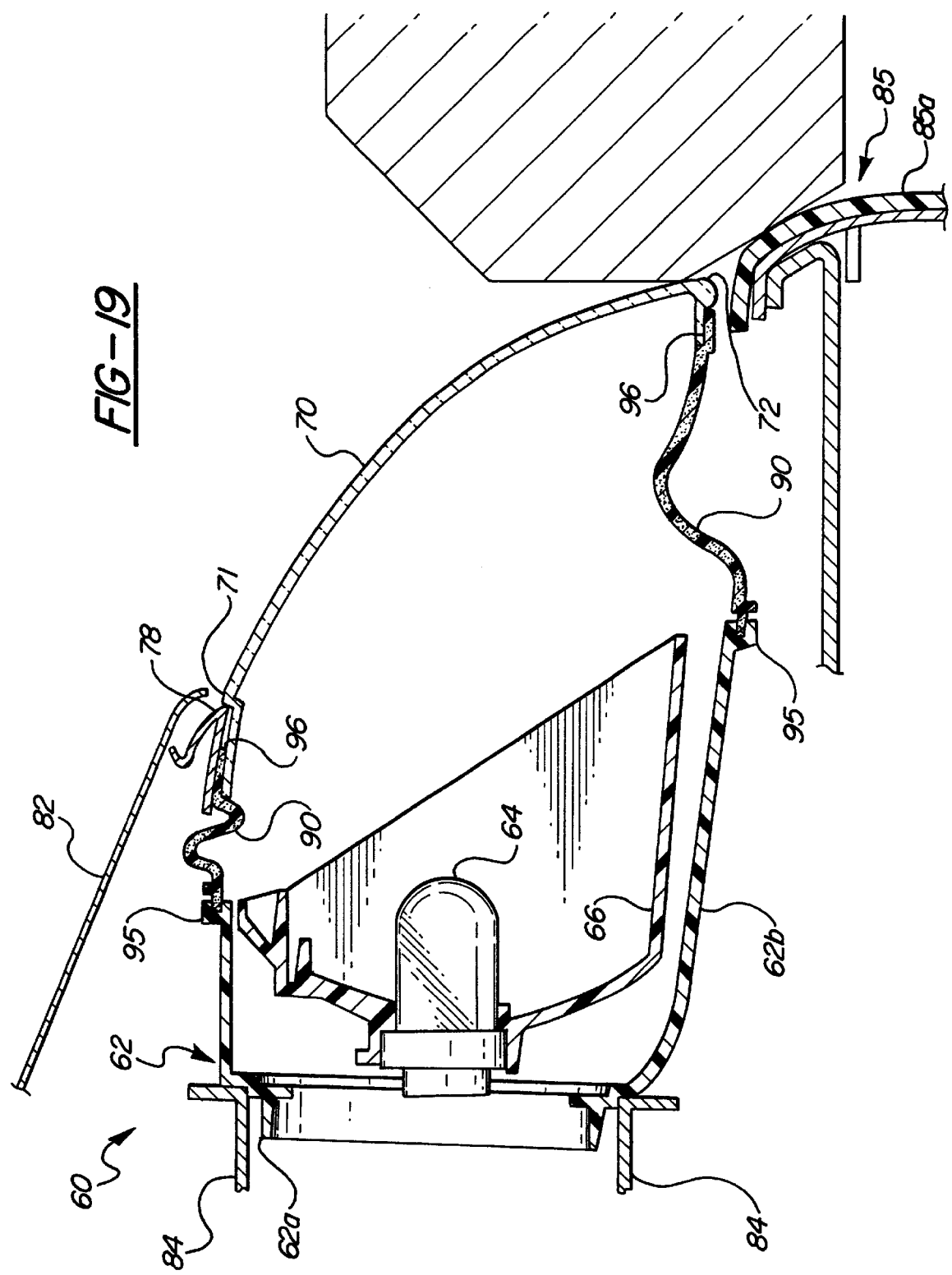

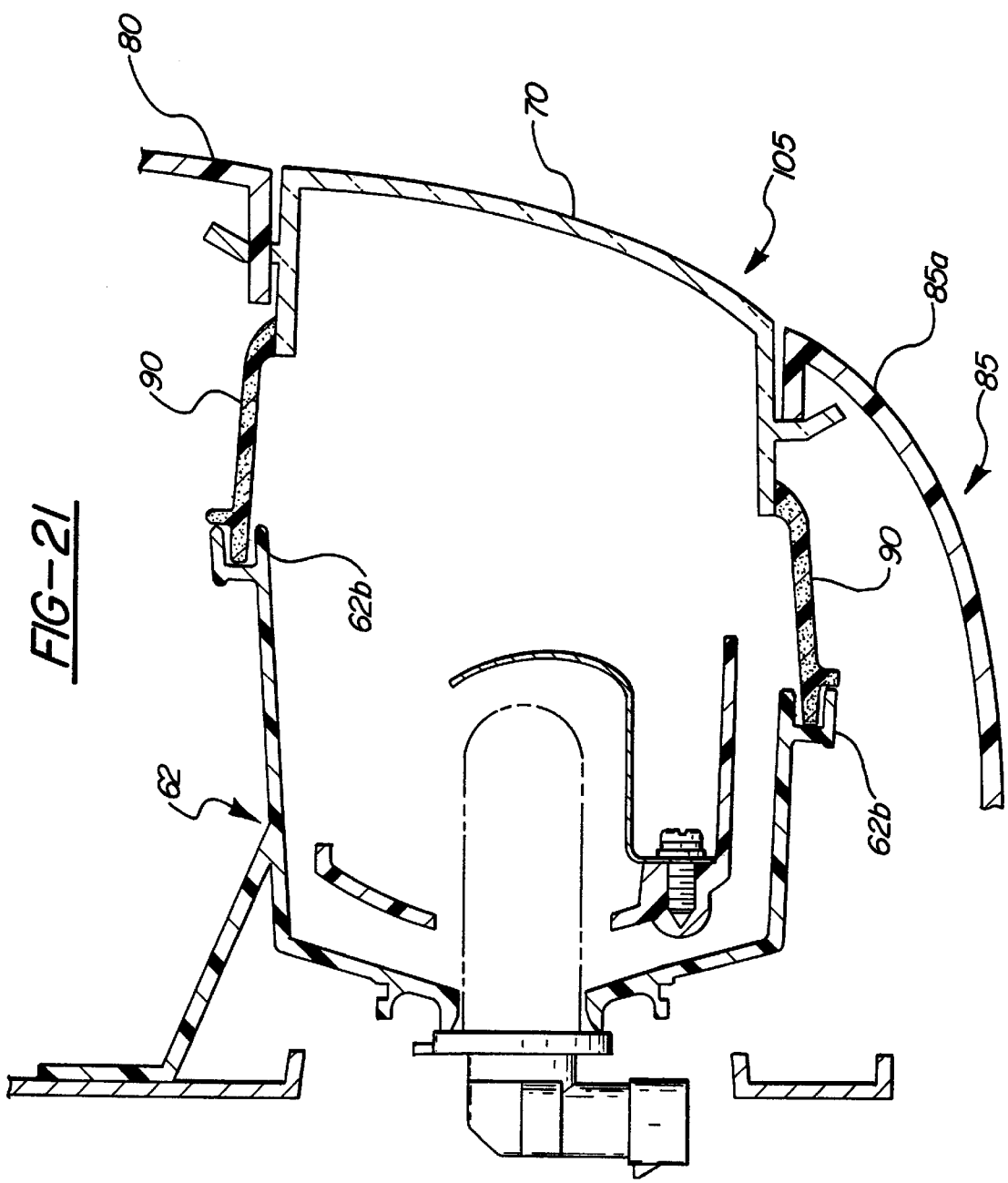

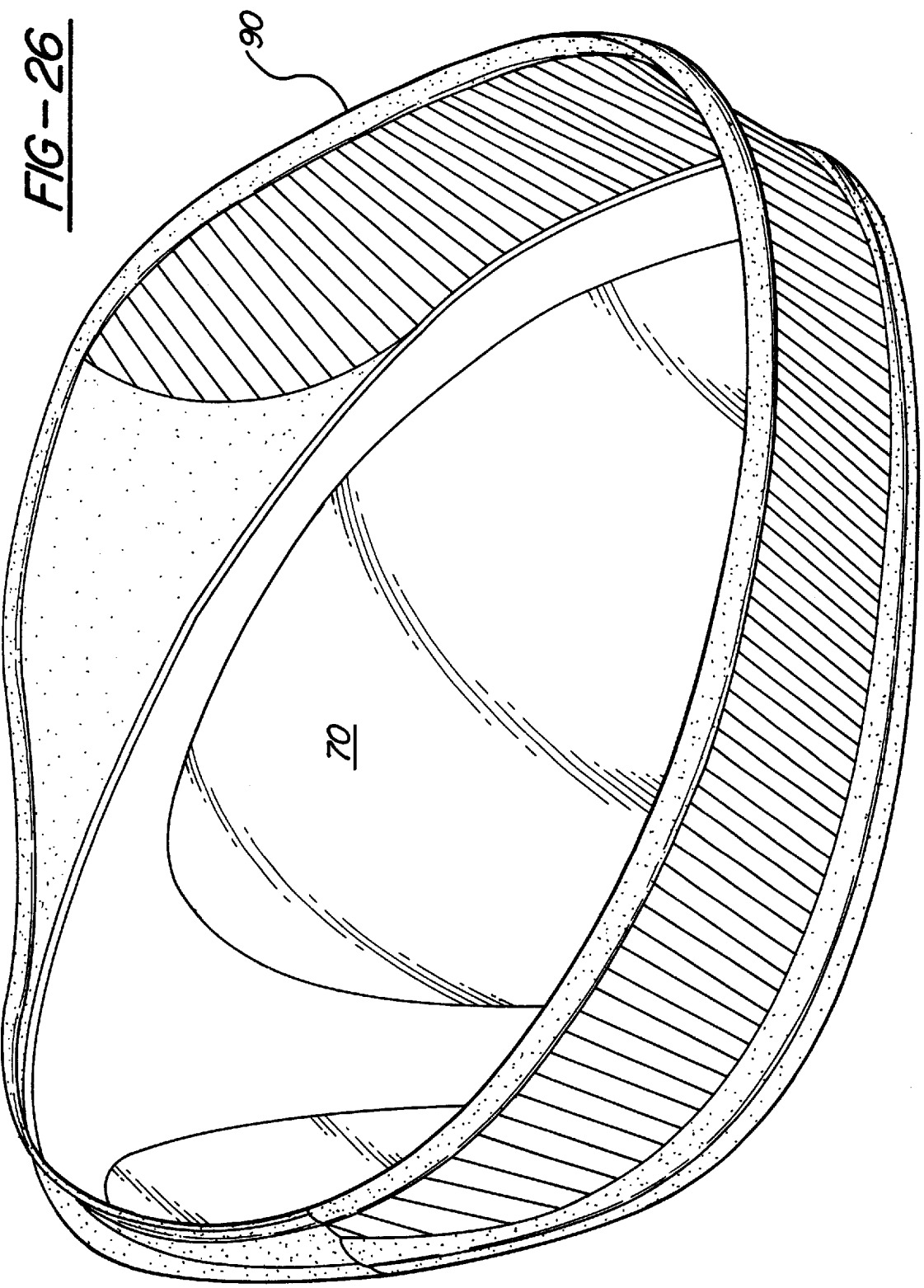

FLEXIBLE LAMP MOUNTING

CROSS REFERENCE TO RELATED APPLICATION

This application is a continuation-in-part application of copending U.S. patent application Ser. No. 09/252,437 filed Feb. 18, 1999, now U.S. Pat. No. 6,900,030.

BACKGROUND OF THE INVENTION

1. Field of the Invention

The present invention generally relates to automobile lamps positioned at the automobile's front end and/or rear end. More specifically, this invention relates to an automobile headlamp or taillamp system that is capable of elastic deformation, yet is rigidly, directly or indirectly, attached to a fixed body component or body component (i.e., trunk, fenders, rear quarter, etc.) of the automobile. The flexible lamp system is able to withstand substantial flexure when the automobile bumper sustains an impact by an object and, therefore, the flexible lamp system is particularly well suited for use with impact-absorbing bumpers that automatically rebound from an impact.

2. Description of the Prior Art

Generally, automobile designers or stylists would like to create aerodynamic body shapes. Their motivation is not merely to reduce drag, but to create contemporary sculpted shapes that appeal to the marketplace. The automobile designers or stylists, however, are hampered by a variety of functional, economical, and other restraints.

With the advent of energy or impact-absorbing bumpers, front and rear ends of an automotive vehicle have been required to undergo significant design changes in order to accommodate the stroke of the bumper, that commonly can be as much as three to four inches. Generally, with respect to the front end of a vehicle, designers would like a clean, convex transition from the front edge of the bumper rearward to the windshield area. Likewise, with respect to the rear end of a vehicle, designers would like a clean, convex transition from the rear edge of the rear bumper forward to the sheet metal associated with the trunk area and rear deck lid. However, when viewing most vehicle designs currently available in the marketplace, this transition is normally an inward, concave box shape as shown in FIG. 1. The front bumper protrudes forward from the vehicle body, or the rear bumper protrudes rearward from the rear sheet metal in order to provide compliance with federal and automotive original equipment manufacturer's vehicle impact standards. These standards generally state that no damage can occur to non-bumper components or safety items, such as headlamps or taillamps, during 5 miles per hour frontal impacts, or 3 miles per hour corner impacts. Traditionally, non-bumper components are manufactured from rigid plastic or other materials that are incapable of deformation and resilient deflection under impact. As a result, in an impact situation, these non-compliant parts are susceptible to cracking, breakage, delocation, and other damage. Therefore, to achieve compliance with the aforementioned impact standards, the original equipment manufacturing engineers have brought the bumper out away from the front and rear body panels, headlamps, taillamps, hood and grille, so that the bumper may stroke, thereby absorbing the impact energy without allowing intrusion into the components with subsequent damage. The clear result from such design is that the vehicle appears boxy, non-aerodynamic, and antiquated.

A closely related problem to the ability to absorb the impact energy of these federal and automotive vehicle impact standards concerns the location of the engine within the engine compartment. For example, in an attempt to obtain more passenger space within a vehicle, recent practice has been to push the mounts of the engine further and further toward the front of the vehicle. Accordingly, the ability to provide additional passenger compartment space is directly affected by the space available in front of the engine to enable moving the engine forward to obtain the maximum passenger compartment space. However, since the overall length of the vehicle is subject to limits dictated by the original equipment manufacturer, bringing the bumper forward away from the body, headlamps, hood and grille intrudes into the maximum length, and the front end space of the vehicle becomes extremely valuable in that it directly affects the ability of automotive engineers to move the engine forward in an attempt to create additional passenger compartment space.

Similar problems existed with respect to automobile grilles, and such problems were solved by the use of a grille that is mounted substantially flush with the surrounding automobile body panels and bumpers, while also being capable of deflecting with the stroke of the impact-absorbing bumper during impact, thereby obviating the need for the grille to either pivot about an anchor point or to be mechanically displaceable with the additional hardware. Such a grille is disclosed in U.S. Pat. No. 5,205,597, owned by the common assignee hereof. The use of the teachings of this earlier invention, however, allowed the grille to be brought into the impact zone and absorb impact without damage. Unfortunately, while this helped to achieve a more aerodynamic and contemporary look in the grille area, the transformation is incomplete because along either side of the grille the fragile headlamp system still requires protection, resulting in the boxy, non-aerodynamic situation as depicted in FIG. 1.

Several automotive equipment manufacturers have attempted specific solutions to this problem, but in doing so have failed to take into consideration the original equipment manufacturer's limitations set forth above, as well as the availability of space between the front bumper and the front of the engine in an engine compartment where the headlamp system must be appropriately mounted. As set forth above, the traditional solution is to position the headlamps or taillamps entirely out of the path of the bumper during recoil after impact. This approach generally entails placing the automobile's headlamps rearward of the bumper or taillamps forward of the bumper, resulting in an extremely square looking profile that has little appeal according to modem design trends as depicted in FIG. 1. Clearly such a design is not aerodynamic, but this approach has been generally followed for lack of a better solution. Another solution recently attempted by some of the original equipment manufacturers is to require the headlamp and/or taillamp to be displaceable such that it can either pivot or otherwise move out of the path of the bumper during energy absorbing impact. Preferably, this approach allows the headlamp and/or taillamp to be mounted flush with the surrounding hood, front end, body panels and bumper, to enhance the styling and aerodynamics of the automobile by providing aesthetically pleasing continuous smooth contour surfaces between the hold, bumper and headlamp lens surfaces. Such an approach is illustrated in Tomforde, U.S. Pat. No. 4,475,148, wherein the headlamp upper and lower housing compartments 3, 6, are pivotably mounted to a fixed component 4, at axis 5, to allow resilient cushioning of an impact in the longitudinal direction of the vehicle to minimize property damage and personal injury. This approach allows the top of the headlamp to pivot rearward when the headlamp is contacted at the bottom edge so as to reduce or prevent property damage in a collision with a vehicle and/or a stationary obstacle, as well as to avoid injury to a pedestrian by yielding in a longitudinal direction about pivot point 5. This approach appears extremely impractical as bumper heights are standardized on passenger vehicles, and an impact on the lower portion of the headlamp would not cause enough rotation to prevent the headlamp from becoming severely damaged in case of an impact in a minor collision with another vehicle or a stationary obstacle.

Another example of an attempt to solve the above problems relating to the location of headlamps or taillamps in the impact zone is taught by Delmastro et al., U.S. Pat. No. 4,466,646. In this reference the lamp assemblies are mounted to an impact bar by the use of U-shaped springs to permit the lamp assembly to swing from its illustrated operating position to a protected position within the confines of the impact bar assembly in response to predetermined frontal impacts. The bumper fascia is mounted to an impact energy absorbing unit and its associated impact bar to absorb side or frontal impacts, store the energy in the impact bar and to avoid transmitting the energy into the vehicle frame, bodywork, or other vehicle components. Any frontal or side impact will permit the hinge assembly limited side and compound movement of the lamp assembly, so that it will not be damaged by any material of the energy absorbing unit crowding the headlamp assembly on corner impacts. After the impact load is removed, the impact bar and end section recover at predetermined rates to their original positions. The lamp assembly, of course, being connected to the U-shaped spring member, will likewise recover to its original position. Note that although this type of solution is proposed for fog lamps and signal lamps, the reference fails to set forth any solution, whatsoever, for avoiding damage to the headlamp in a frontal zone collision. Clearly, the design criteria to avoid damage to headlamps requires the headlamps to be set rearward a sufficient amount to allow the bumper to properly stroke during frontal impacts.

Another attempt to protect fog and taillamps mounted in the impact zone is shown in Vogelgesang, U.S. Pat. No. 5,288,177, wherein a fog lamp and turn signal lamp are mounted to the elastic bumper covering to allow the fog and turn signal lamp unit to move backward in the case of a 30° pendulum impact after it has been acted upon by the impact and to return to its original position. The fog lamp and turn signal housing are attached to a front bumper covering that, when impacted, moves toward the rear of the vehicle by pivoting about a fixed pivot mounted on the body that provides appropriate support for the fog lamp and turn signal housing, and allows the housing to pivot rearward to absorb the impact and return to its original position thereafter. The supporting element is mounted at one end at a fixed member attached to the wheel housing and to the fog lamp and turn signal housing to allow the supporting element to pivot rearward. After impact, the elastic bumper covering with the lamp units and the supporting element are returned to their original positions by the restoring force of the pneumatic impact absorbing devices.

In Roschinski et al., German patent publication DE 3802104 A1, the lighting unit is mounted in the area of the impact zone. Through the use of spherical balls mounted in a spherical socket the lighting unit is allowed to be removed from the socket upon impact in the longitudinal direction, and returned into the spherical socket by two compression coil springs located between the housing and the body of the vehicle. Because of the use of two spherical sockets that are mounted respectively in an upper and lower zone, the reference further teaches that a shock load acting obliquely from one side only will cause only one of the spherical balls to be displaced from the spherical socket and resume its original position through the use of one coil spring providing sufficient force to again engage the spherical ball with the spherical socket upon removal of the impact force. A similar arrangement is proposed for the fog and turn signal lamps, as well as for the rear lamps of the vehicle. As an alternative to the coil springs, a hydraulic, pneumatic or magnetic system that generates an appropriate force for restoring the position of the housing is also contemplated.

A further attempt to allow headlamps to be mounted forward, flush with the front fascia of the vehicle, is disclosed in Kodama et al., Japanese Patent JP3-208738-A2, wherein the headlamp is mounted to a guide rail spaced a predetermined distance from side frame members, and interconnected with a connecting bar whose lower end is connected to the side member and upper end to the movable frame containing the headlamp, and adapted for sliding on the guide rail. The torsion bar system has a front part mounted in close proximity to the bumper fascia so that upon impact the bumper fascia collapses and retreats, activating the crank portion of the torsion bar system whereby the connecting bars are pivoted to slide the headlamp in a rearward direction away from the area of the impact zone to prevent damage thereto. After restoration of the bumper fascia to its original position, through the use of impact absorbing material such as foam, the torsion bar system utilizes its stored energy to return the headlamp along the guide rails to its original forward position. An alternate embodiment discloses the use of a scissor-like, two-bar mechanism that operates in combination with a torsion bar system to retract the headlamp in a rearward direction upon impact and through the stored torsional energy in the torsion bar system return the headlamp to the original position upon release of the impact with the bumper fascia.

As can clearly be observed from a review of the prior art, with the exception of German Patent DE 3802104-A1 and Japanese Patent 3-208738-A2, the prior art addressing of this problem only concerns fog lamps or turn signal lamps where damage criteria after impact, as established by government entities or original equipment manufacturers, is very low or nonexistent. The proposal disclosed in the German reference relies mostly on a complex spring system to return the housing to its original position while the Japanese reference teaches that the bumper impact absorbing material will allow the pivoting mechanism cooperating therewith to return the lamp to its original position. Since none of the bumper impact absorbing materials are required to return a headlamp to its original position by any automotive regulations, it is not possible to rely on such a system to permit the headlamp to return to its original position after a bumper impact due to the strict regulations and tight tolerances on headlamp aim patterns that would not allow any misalignment of aim pattern after impact outside of the tolerance limitations. Further, the teachings of both the German and Japanese patents have completely neglected the value of the space considerations surrounding the headlamp mounting area that directly reflects upon the forward placement of the engine and, in turn, the amount of space available in the passenger compartment of the vehicle. Accordingly, none of the systems provided in the prior art are adaptable to headlamps or taillamps that have strict regulations concerning damage after bumper impacts.

Therefore, what is needed is a simple, cost effective headlamp, taillamp, and/or auxiliary lamp system that can be brought into the impact zone to provide designers the freedom to create flush, convex-shaped, aerodynamic lamp systems for vehicles, that after impact return to their original positions without substantial permanent damage, and that continue to operate within the limits of the specifications set forth for headlamps, taillamps, or auxiliary lamps for automotive vehicles.

SUMMARY OF THE INVENTION

According to the present invention there is provided a headlamp and/or taillamp system for an automobile having an impact-absorbing bumper. The headlamp of the preferred embodiment is designed to be mounted substantially flush with the surrounding automobile body panels and/or bumper. Additionally, the headlamp and/or taillamp system provides the capabilities to deflect with the stroke of the impact-absorbing bumper during impact without significant damage to the headlamp and to permit the headlamp to relocate to its pre-impact position without substantial loss of the functionality thereof. The aforementioned capabilities obviate the need for the headlamp and/or taillamp to pivot about an anchor point or to be mechanically displaceable with additional hardware. Consequently, the lamp system, at least one component, and/or at least a portion of at least one component is preferably formed from resilient, impact-resistant material, such as a high-impact plastic in combination with a resilient deflection member located selectively between the lens and the housing, between the housing and the body of the vehicle, or between the inner lens and the outer lens in a dual lens system. Alternatively, the resilient deflection member may be either only the housing or only the lens itself. In all embodiments, the resilient deflection member resiliently responds to an impact in the manner described above.

The material for the resilient deflection member must be selected to have a yield strength that is adequate to sustain a predetermined degree of deformation, corresponding to the amount of deflection required to deflect with the bumper stroke, as will be explained more fully below. Additionally, the resilient deflection member must meet standard automotive specifications for a typical vehicle component.

The invention contemplates placing the headlamp lens and associated components forward into the impact zone and using a resilient deflection member selectively located either between the housing and the lens, between the housing and the vehicle body (or components attached thereto), or between the inner lens and the outer lens in a dual lens system to resiliently respond to impact. Alternatively, the resilient deflection member may be either the housing or the lens itself. Since the headlamp lens configuration is a direct function of the vehicle application, that is, the type of vehicle the lens is used on, the placement of the resilient deflection member, in order to obtain the desired deflection, must be selective in order to adapt to each specific vehicle application. The resilient deflection member is made of a more flexible material; preferably, TPU (urethane thermoplastic). Alternatively, TPO (rubber modified polypropylene), RIM (urethane), or TPE (thermoplastic elastomer) etc., may be used.

In the preferred embodiment, the lens is generally a more rigid material, like polycarbonate and the housing is also relatively rigid, and can be made from either polypropylene, polycarbonate, or thermoset BMC polyvinylester, molded material. In the preferred embodiment disclosed, the lens has a body portion that has an upper edge that generally extends in a horizontal extent adjacent a body panel such as the engine hood or front fascia of the automobile, and a lower edge that generally extends in a horizontal extent adjacent the bumper or bumper fascia. Accordingly, the headlamp, taillamp, fog light or turn signal light utilizing the invention as described herein achieves a more aerodynamic, contemporary look, and allows stylists the complete freedom to create a flush, convex-shaped aerodynamic front end or rear end system with each vehicle design. Of course, one skilled in the art will recognize that any material may be used so long as it provides the functionality described hereinafter for the preferred embodiment of the invention.

Because the headlamp system is mounted further forward into the impact zone, car stylists are given the freedom to utilize the additional space so as to provide the maximum amount of space in the engine compartment to be potentially used to allow engines to be mounted further forward and thereby increase the space available in the passenger compartment.

The resilient deflection member serves multiple purposes. Its primary purpose is to allow the lens or other components of the headlamp assembly to move upon impact without damage to itself or any other surrounding assembly components. A further obvious objective is to act as a seal between the lens and the housing so that moisture, water, dust or other contaminants do not degrade the function of the lamp system. Also, the use of a resilient deflection member may enhance the aesthetic effect of the vehicle by using the resilient deflection member as a styling element of the lens or headlamp system. Through the use of differently-colored materials, various finishes, and texture patterns, the resilient deflection member can be used as a decorative element. Additionally, the resilient deflection member may reduce or prevent property damage or personal injury during a collision due to the capability of the resilient deflection member to yield under impact and absorb a portion of the energy generated therefrom.

The actual design of the resilient deflection member is variable and highly dependent on the design of the lamp system and the headlamp as a whole. In the preferred embodiment, the resilient deflection member is placed selectively between the lens and the housing, or between the housing and its attachment point on the vehicle. Alternatively, the resilient deflection member may be placed between the inner and outer lens in a dual lens system, or the resilient deflection member is the lens itself. The resilient deflection member does not have to be a continuous ring about the periphery of the lens. The following factors define the parameters of the design and use of the resilient deflection member: the manner in which the lens is designed to deform during bumper impacts, the space in which it is allowed to deform without damaging itself, the physical location or structural interrelationship of the lens itself as well as the interior lamp components and the surrounding components, and the actual manner in which the resilient deflection member can be manipulated to accommodate specific automotive applications. Flexing of the resilient deflection member is also a function of the resiliency of each component of the headlamp, taillamp, or fog lamp system. Optimizing a design is normally an iterative process, utilizing structural Finite Element Analysis (FEA), simulating the various impacts, and ultimately performing actual physical testing of prototypes, as is hereinafter described.

The deflection characteristics of the resilient deflection member provide the basic deflection capability of the headlamp system, or any one of its components, i.e. the lens, the housing, or associated components. If desired, additional deflection can be provided by varying its section modulus along its length or width. Preferably, at least the lower area of the lens may be provided with a section modulus that is reduced in at least one predetermined area to provide a predetermined degree of elasticity without exceeding the predetermined yield strength of the material and without affecting the optical characteristics of the lamp system. The section modulus may also vary such that there is a predetermined minimum section modulus at any of one or more points. As a result, the predetermined degree of elasticity provides a degree of resiliency to the entire headlamp system.

With the above capability for flexing, the headlamp system can be fixed to the automotive vehicle at points along the upper edge and sides to firmly support the headlamp system, while still being able to elastically deform as a result of the deflection characteristics and variation in section modulus of the various components, in combination or independently (i.e., the lens only), so as to be able to both sustain a predetermined impact or to stroke with the bumper during an impact without exceeding the predetermined yield strength of the resilient deflection member. Due to the localization of the flexing in predetermined areas of the lens, the deflection in the remainder of the body portions away from the predetermined areas is significantly reduced. As a result, the likelihood of permanent yielding occurring in the lens is eliminated. Accordingly, reducing the section modulus in any one or more predetermined points of the headlamp lens or housing in conjunction with using a material having predetermined deflection characteristics allows the headlamp to be rigidly attached to the automobile yet provide deflection characteristics according to the invention. Consequently, there is no requirement for the headlamp to be pivotable about a mechanical pivot when the bumper sustains an impact. In addition, the need for additional hardware or special resilient fasteners is reduced or eliminated.

A significant advantage of the present invention is that the section modulus of any one of the components of the lamp system may be modified without affecting the exterior appearance of the lamp system and/or lens associated therewith. As a result, the optimum section modulus for different applications can be experimentally ascertained by either modifying the mold that forms the member or by mechanical means to contour and remove material from any area of the resilient deflection member.

It is also contemplated that spring steel inserts can be molded into the resilient deflection member to assist the lens in returning to its original position in some vehicle applications. This would assist in defining and controlling the location and shaping of the resilient deflection member while providing an appropriate assist force in returning it to its original pre-impact position. Also, such an arrangement could be used if there is a need to flex the resilient deflection member beyond the resilient deflection member's material yield point in specific applications, yet enable the resilient deflection member to completely return to its pre-deformed position utilizing the spring inserts molded therein.

Accordingly, it is an object of the present invention to provide a headlamp, taillamp, or auxiliary lamp system that is able to withstand a predetermined impact without fracturing any of the components thereof by the use of a resilient deflection member as at least one of the components, or a portion thereof, of such system, or by the use of the resilient characteristics of a combination of components and/or a combination of portions of components of such a system.

It is also an object of the present invention to provide a method for manufacturing a headlamp, taillamp, or auxiliary lamp system that is able to withstand a predetermined impact without fracturing any of the components thereof by the use of a resilient deflection member as at least one of the components, or a portion thereof, of such system, or by the use of the resilient characteristics of a combination of components and/or a combination of portions of components of such a system.

It is a further object that the invention can be practiced wherein each of the components of the lamp assembly collectively contributes a resilient deformation capability such that the lamp assembly can withstand a predetermined impact without fracture thereto.

It is a further object of this invention that such a headlamp, taillamp, or auxiliary lamp system be suitable for use on an automobile having an impact absorbing bumper such that the automobile headlamp, taillamp or auxiliary lamp system is mounted forward with the bumper or body panels surrounding it yet is capable of resiliently deflecting with the stroke of the bumper without sustaining structural damage thereto without significantly affecting the optical characteristics of the lens.

It is yet a further object of this invention that such an headlamp, taillamp, or auxiliary lamp system be provided with a reduced section modulus in any one of the areas of the components of each of the systems for concentrating the deflection in that area of the specific component, while reducing the flexure in the remainder of the headlamp, taillamp, or auxiliary lamp components.

It is yet still a further object of this invention that by concentrating the flexure of the headlamp, taillamp, and auxiliary lamp components in predetermined areas, the headlamp, taillamp, or auxiliary lamp system can be rigidly attached to the automobile body components without the need for additional pivoting hardware or resilient brackets to support the headlamp, taillamp or auxiliary lamp system.

It is another object of this invention that such a headlamp, taillamp, or auxiliary lamp system be securable directly in a fixed location to the automotive body or body components so as to provide structural resistance to environmental effects such as wind and vibration.

It is still another object of this invention that such headlamp, taillamp or auxiliary lamp system have reduced cost, component weight and complexity, yet provide the ability for the headlamp, taillamp or auxiliary lamp system to provide all the functionality of current headlamp systems, while appropriately responding to bumper impacts without damage thereto.

It is yet another object of this invention that the resilient deflection member is formed from any material or combination of materials that permits the resilient deflection of the lamp system so as to provide the functionality to appropriately respond to impacts without damage thereto.

It is also an object of this invention that the resilient deflection member is the lens itself, generated from a thin sheet of polycarbonate plastic and thermoformed to the desired design criteria.

It is a further object of this invention that the resilient deflection member is generated from a low flex modulus optically clear TPU.

It is another object of this invention to generate the resilient deflection member by extruding thin sheet stock, thermoforming the lens shape and trimming the offal.

Another object is to generate a resilient deflection member that utilizes an injection/compression mold process.

Yet another object is to generate the resilient deflection member using a thin wall molding technique to create a thin lens.

Yet another object of this invention is to produce a resilient deflection member molded in a localized area to ease and direct the folding action during an impact. This effect can be achieved by the use of reinforcing ribs, darts, or variations in thickness. This effect can also be achieved through the use of a composite consisting of different flex moduli materials selectively laminated or two shot molded together.

Other objects and advantages of this invention will be more apparent after a reading of the following detailed description taken in conjunction with the drawings provided.

BRIEF DESCRIPTION OF THE DRAWINGS

FIG. 5 is a partial cross-sectional view of a portion of the automobile front end in accordance with the preferred embodiment, taken along line 5—5 of FIG. 4;

FIG. 6 is a partial cross-sectional view of the headlamp assembly and associated vehicle body and body components of the invention, wherein the flex material is molded only to the bottom portion of the lens;

FIG. 13 is a cross-sectional view of the major components of the lamp assembly of an alternate embodiment of the invention wherein the headlamp assembly having a dual lens assembly includes an inner lens and flex material molded to the outer lens;

FIG. 16 is a cross-sectional view of the major components of the lamp assembly of an alternate embodiment of the invention wherein the entire lens is flex material;

FIG. 19 is a cross-sectional view of the major components of the automobile front end of FIG. 3 illustrating a frontal impact with an obstacle;

FIG. 20 is a cross-sectional view of the major components of the lamp assembly of an alternate embodiment of the invention wherein the flex material is molded with the lens and the lens of the headlamp is designed to register with surrounding front end fascia;

FIG. 21 is a cross-sectional view of the major components of a fog lamp assembly for an automotive vehicle wherein the flex material is attached to the housing and to the lens;

FIG. 26 is an isometric view of the backside of the lens and flexure member.

DETAILED DESCRIPTION OF THE PREFERRED EMBODIMENT

Figure 1:
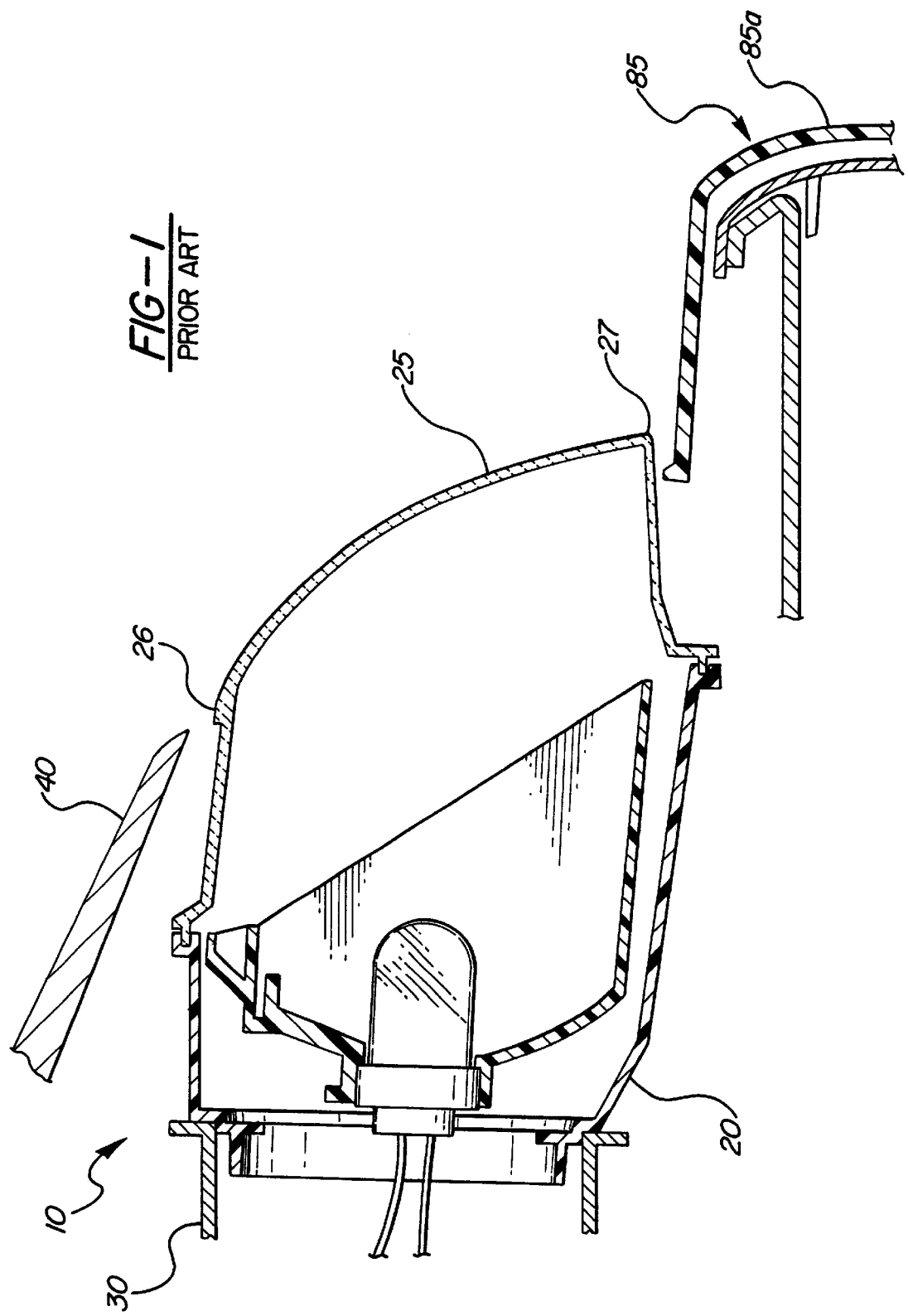
FIG. 1 is a partial cross-sectional view of a prior art headlamp system wherein the bumper extends forward, resulting in a convex hood line that aerodynamically transitions into the upper edges of the headlamp but results in an inward box shape and concave transition from the lower edge of the headlamp to the front edge of the bumper fascia.
Figure 3:
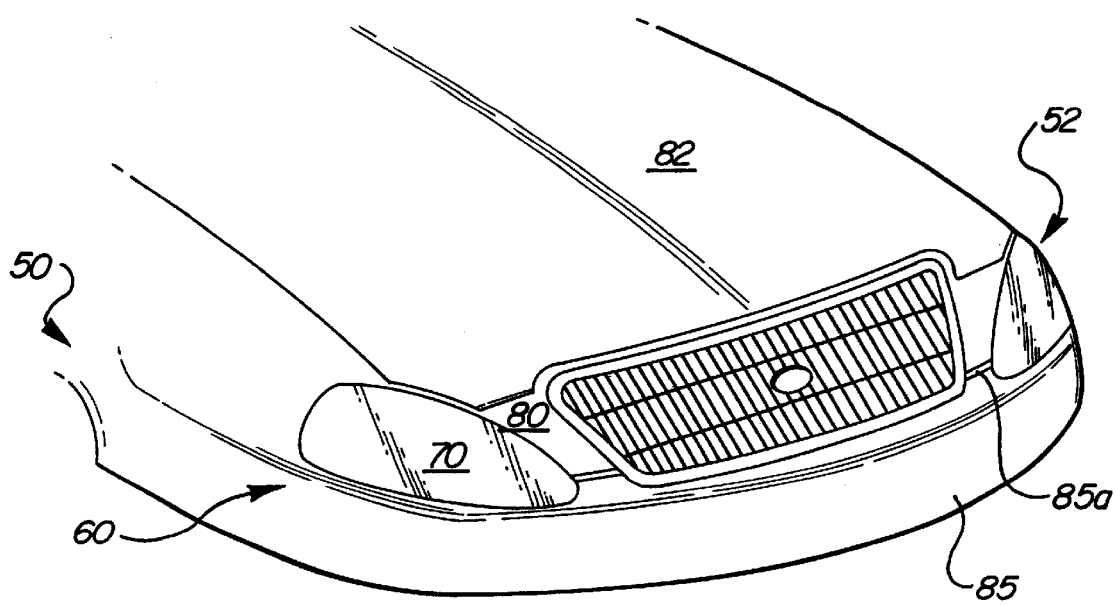
FIG. 3 is a partial perspective view of an automobile front end having an impact-absorbing bumper and a headlamp system in accordance with the preferred embodiment of this invention.

As set forth above, FIG. 1 is an illustration of a prior art headlamp assembly 10 having a lamp housing 20 mounted to a body member 30 of the front end of an automotive vehicle, similar to that shown in FIG. 3. An optical lens member 25 having a top portion 26 is mounted substantially flush with a hood member 40 of the vehicle (not shown). A bottom portion 27 of the optical lens member 25 is located well rearward of a front bumper assembly 85 and associated fascia 85a so as to prevent the front bumper assembly 85 and associated fascia 85a from damaging the optical lens member 25 when the front bumper assembly 85 is impacted.

Figure 2:
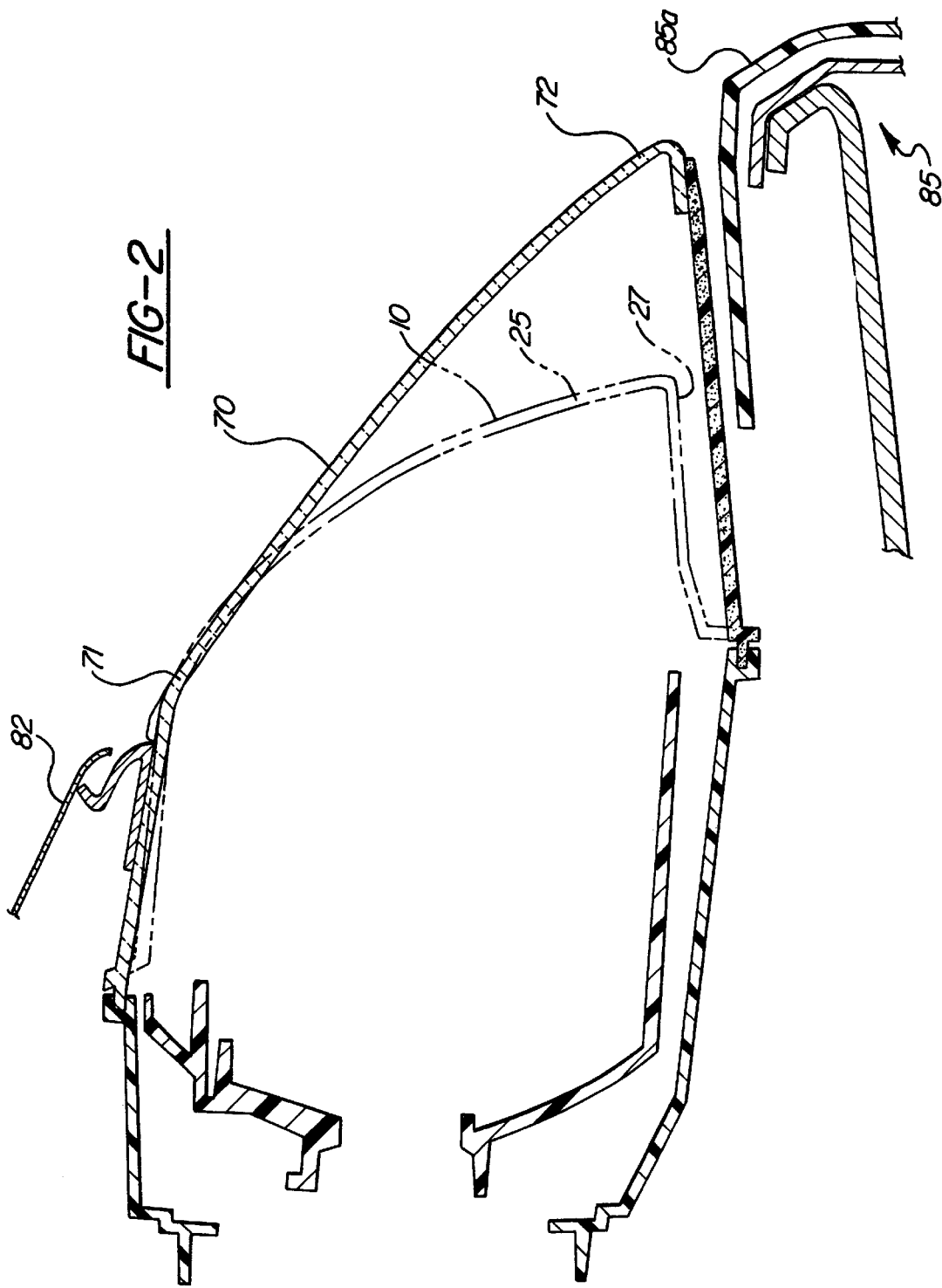
FIG. 2 is a partial cross-sectional view of both the current invention and the prior art, wherein the prior art headlamp system depicted in phantom shows the concave hood line referenced in FIG. 1, with a partial cross-sectional view of the current invention superimposed thereover wherein the fascia, the headlamp system, and the bumper form one smooth, aerodynamic, aesthetically-pleasing hood line as contrasted with the concave hood line of the prior art.

With reference to FIG. 2, there is shown a contrasting view of the hoodline of the prior art headlamp assembly, depicted in phantom, and the current invention, superimposed thereover. As depicted in FIG. 2, the prior art headlamp assembly 10, the optical lens member 25, and the bottom portion 27 thereof are located rearward of the front bumper assembly 85 and associated fascia 85a, thereby forming a distinctly concave, boxy hoodline similar to that shown in FIG. 1. By contrast, according to the current invention, an upper portion 71 of a headlamp lens 70 is smoothly aligned with a hood 82 of the vehicle. Further, the lens 70 is shaped such that a lower portion 72 thereof substantially aligns with the front bumper assembly 85 and its associated fascia 85a, thereby forming a smooth, aerodynamic hoodline.

Figure 4:
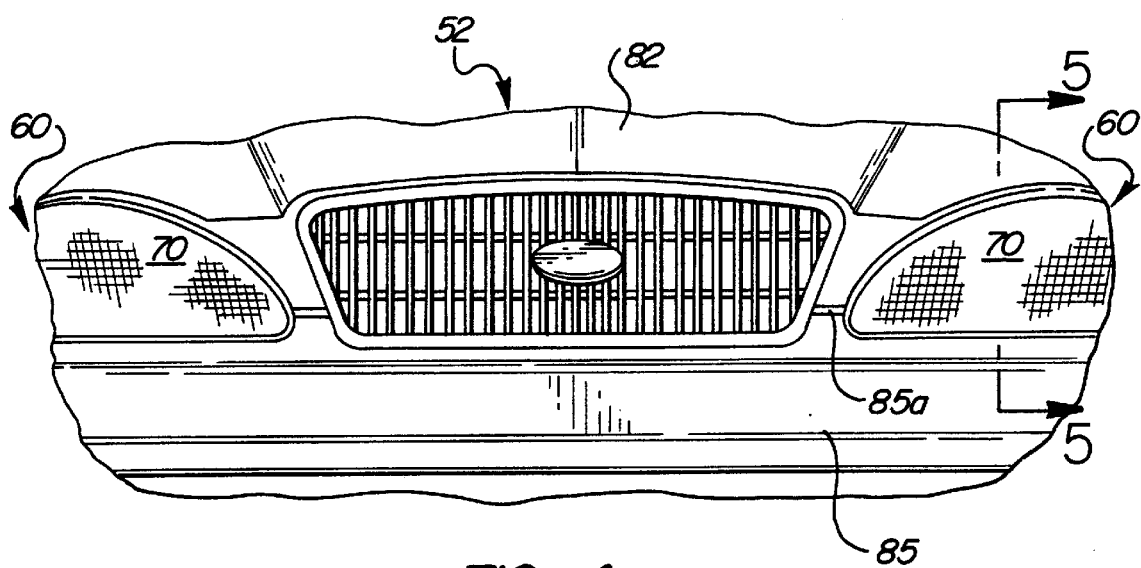
FIG. 4 is a fragmented frontal view of the automobile front end of FIG. 3.

With reference to FIGS. 3 and 4, there is shown an automobile vehicle 50 and its front end portion 52 that has a headlamp or headlamp system 60 with the headlamp lens 70 mounted forward into the impact zone and blending with the body panels and/or fascia surrounding the lens 70, according to the invention. As illustrated, the lens 70 is mounted to blend with fascia 80 that is located forward of the engine hood 82. In this position, the headlamp system 60 is located above the front bumper assembly 85 of the automobile front end portion 52. According to the preferred embodiment, the headlamp system 60 can be mounted forward so as to have the lens 70 adjacent to its surrounding automobile body panel structure, such as the bumper assembly 85, front end fascia 80 and/or downwardly extending hood 82 as shown in FIG. 1, while meeting or exceeding current impact requirements.

The impact requirements are strictly defined by various government agencies worldwide. The most common regulations concern low bumper speed impacts and lighting functionality. In general, the regulation's purpose is to assure no degradation in lighting functions or long term durability after low speed (5 miles per hour or less) impacts. The primary goal of the invention disclosed herein is to achieve the necessary deformation without exceeding the yield limit in any of the lighting components. Minor yielding in a resilient deflection member (as shown in FIG. 5 at 90) is allowable as long as the lens 70 and headlamp housing (not shown) do not exceed their yield limit and return to their original positions after the impact force is removed. Some regulations allow mis-aiming to occur after such low bumper speed impacts as long as the deviation is within the specification limits of the aiming system. With reflector optic and projector optic style headlamps wherein the lens 70 is clear with no optical characteristics designed therein, the need to return the lens 70 to its exact original position is less critical than in lens optic style headlamps wherein the lens 70 has an optical function in directing the beam of light.

In current automobiles, the front bumper assembly 85 is an impact-absorbing bumper assembly that is designed to withstand and absorb a predetermined impact without permanent deformation. At this time, such a front bumper assembly 85 is required to absorb a 5 mile per hour impact, after which the front bumper assembly 85 must return to its pre-impact position. During the course of an impact, the front bumper assembly 85 will travel toward the rear of the vehicle three inches or more. After impact, in which the energy of the impact has been dissipated through the resilient structure of the front bumper assembly 85 and associated fascia 85a, the bumper will return to its original pre-impact position.

Because of the resilient nature of the front bumper assembly 85, the headlamp system 60 of the present invention, when mounted in the impact zone, is also required to resiliently respond to an impact to the front bumper assembly 85, particularly when the headlamp lens 70 is mounted forward next to the front bumper assembly 85. Accordingly, the material and structure of the headlamp system 60 must be such that the elasticity of the various components of the headlamp assembly acts to absorb the impact forces without any component of the headlamp system 60 fracturing or discontinuing to function as intended.

As an initial matter, the material of the various components of the headlamp assembly must have sufficient impact resistance as well as provide a seal for the headlamp assembly so that moisture, water, dust or other environmental contaminants do not degrade the optical characteristics and function of the lamp system. Thus, when properly designed, this material deflects under impact, relocates to its original, pre-impact position, and maintains the aforementioned seal. Any material capable of performing the previously mentioned functions may be used. The primary consideration for the resilient, deflective capability of such a material is that the rigidity of a structural member is dependent upon the flex modulus of the material from which it is made. Flexure of any component can be further enhanced by changing the section modulus of the component. Briefly, the section modulus is the component's moment of inertia about its neutral bending axis divided by the distance between the neutral axis and the highest-stressed fiber of the member. The section modulus is entirely a property of the shape and size of the cross section of the member.

A primary consideration for evaluating the stress in a member is based upon its deflection characteristics. The formula for calculating the deflection in a beam is given by:

$$f = Pl^3/mEI$$

where f is the measurable deflection in the beam, P is the deflection load, I is the span of the beam, m is a coefficient determined by the manner in which the beam is supported, E is Young's modulus for the material, and I is the cross section's moment of inertia about the neutral bending axis As will be more fully described below, a decrease in the section modulus I/c produces an increased deflection f in the member under a constant load P. Accordingly, by varying the section modulus of a member and maintaining a constant deflection the stress can be substantially influenced. This relationship will be discussed more fully below in conjunction with a more detailed description of the construction of the headlamp system 60 of the present embodiment.

As a second consideration, flexure of a structural component may also be controlled by changing its section modulus. As stated above, the section modulus allows one to calculate the maximum stress in a member according to the equation:

$$S=M/(I/c)$$

where S is the maximum stress (at the highest-stressed fiber located a distance c from the neutral axis of the member—generally, the outermost fiber of the member), M is the bending moment on the member, and I/c is the section modulus. Accordingly, with a constant bending moment M, any increase in the section modulus I/c (roughly, any increase in the cross section of the member) will proportionally reduce the stress S in the outermost fiber of the member, thereby necessitating a higher load to produce a fracture in the member.

More importantly for the purposes of this invention, the flexibility of the headlamp assembly and particularly the lens 70 must be provided by its own structure or its adjoining structure such that the headlamp assembly components including the lens 70 will more readily deflect at predetermined locations. As a result, the stresses during impact will be concentrated in predetermined regions of selected components to be better able to absorb them without exceeding the yield point of the material from which the components are made while minimizing the effect of the impact upon the remainder of the components of the headlamp assembly without deterioration of the optical characteristics of the headlamp assembly.

With reference to the preferred embodiment of the present invention shown in FIG. 5, there is a typical reflector optic style headlamp system 60 including a lamp housing 62 having one end 62a mounted by any appropriate method to a part of a body 84 of an automotive vehicle (partially shown in FIG. 4). An electric light source 64 is mounted in a typical reflector member 66 whose parabolic inner surface 64a is silvered to reflect and direct light rays emanating from the electric light source 64, as is well known in the prior art. Alternatively, a suitable direct filament lamp design may be readily utilized instead of the lamp assembly shown. The lamp housing 62 has a forwardly-extending portion 62b for purposes to be described hereinafter.

With reference to FIGS. 5 and 6, the headlamp system 60 is illustrated as being mounted forward into the impact zone described above. The upper portion 71 of the lens 70 is mounted adjacent to the automobile hood 82 so as to aesthetically blend therewith while the lower portion 72 of the lens is directly located in the impact zone adjacent to the bumper fascia 85a to aesthetically blend therewith and thereby provide an aerodynamic body shape, preferable to car designers or stylists. This arrangement provides a clean, generally smooth transition from the front edge of the front bumper assembly 85 rearward to the hood 82, similar to that shown in FIG. 2, and significantly reduces drag from the prior art arrangement. This contemporary, sculpted shape also has significant appeal in the marketplace.

In the preferred embodiment shown in FIG. 5, the headlamp system 60 is configured with a resilient deflection member 90 completely circumscribing the lens 70, to permit the lens 70 to move rearward upon impact without damage to itself or any other component of the headlamp system 60.

The resilient deflection member 90 is also attached to the forwardly-extending portion 62b of the lamp housing 62. A gimp 78 attaches to the resilient deflection member 90 and interacts with the hood 82 and the upper portion 71 of the lens 70 to close out visual gaps as well as reduce the noise of the wind associated therewith. Although the primary purpose of the resilient deflection member 90 is damage prevention, the resilient deflection member 90 also acts as a seal between the lens and the headlamp housing so that moisture, water, dust or other contaminants do not degrade the function of the headlamp system over its intended life cycle. Further, the resilient deflection member 90 can be utilized to provide an aesthetic styling effect, through the use of different color materials or different external finishes to decorate the resilient deflection member if desired, as further detailed in various embodiments described below. Although shown in FIG. 5, the resilient deflection member 90 does not have to be a continuous ring about the periphery of the lens 70, as shown in FIG. 6.

The predetermined design specifications of the resilient deflection member 90, e.g., the yield strength and elasticity, as well as the position of the resilient deflection member 90 within the headlamp system 60, the position of the headlamp system 60 within the impact zone of the automobile, and other such predeterminations are variable and highly dependent on the design requirements for a specific vehicle as a whole. These design predeterminations are normally derived from an iterative process utilizing Finite Element Analysis (FEA), simulating various types of impacts and ultimately performing actual physical testing of prototypes.

Finite Element Analysis is an approximation method for studying continuous physical systems. This method employs a numerical analysis technique whereby a structure of any degree of complexity is broken down into simple structural elements of which certain characteristics are known and can be defined. These elements are then assembled to form the overall structure, taking into account compatibility conditions. By knowing the characteristics of the individual simple structural elements, the governing equations for the entire structure may be obtained. This enables a mathematical model to be constructed in such a manner that it sufficiently corresponds to the actual body in terms of its physical behavior. Finite Element Analysis enables the engineer/designer to confirm the characteristics of the impact zone, thereby enabling the engineer/designer to determine with a high degree of certainty the magnitude as well as direction of deformation.

This process may be used to determine, for example, the characteristics of the impact zone by completing an FEA of the front end of the automobile, then utilizing those characteristics to determine the direction and magnitude of deformation of the resilient deflection member 90; and, finally, defining the characteristics of deformation. One skilled in the art will recognize that other processes may be used to formulate such predeterminations as well.

Additional criteria for optimization of the design of the headlamp system 60, and specifically the resilient deflection member 90, include the effect of vibration and the perceived quality of design. For example, if the resilient deflection member 90 and lens 70 are too flexible they will feel flimsy to the consumer and lose credibility. More importantly, if the headlamp system 60 or any component thereof is too flimsy, it could vibrate and distort the light projected by it on a road and cause irritation to the driver, oncoming traffic, or traffic ahead of the vehicle. Further criteria include heat sag and cold temperature impact, due to the high temperatures generated by light bulbs, the engine, ambient conditions, solar heat, or a combination thereof. The resilient deflection member candidate materials must retain their functional characteristics in order to ensure that the characteristics of the components of the headlamp system 60 continue to function properly after a collision. Also, the lamp system must still function properly after low-speed impacts at low temperatures. Accordingly, the resilient deflection member could be made of a more flexible material such as urethane thermoplastic (TPU), rubber-modified to polypropylene (TPO), polyurethane (RIM), thermoplastic elastomer (TPE), and the like. At this time, TPU is the preferred material in the preferred embodiment due to similar shrinkage characteristics with polycarb lenses in a two shot molding operation, described below. The lens 70 is generally a more rigid material such as polycarbonate. The material of the lamp housing 62 is also relatively rigid, e.g., polypropylene, polycarbonate, or thermoset polyvinylester (BMC).

In order to maintain the integrity of the headlamp system 60 in the preferred embodiment shown in FIG. 5, the resilient deflection member 90 ultimately selected for a specific application must be attached to the lamp housing 62 and lens 70 in a sealed relationship. Accordingly, in this preferred embodiment, appropriate seals 95 and 96 between the lamp housing 62 and with the lens 70 must be established to ensure the continued long-term integrity of the headlamp and its optical characteristics over its life cycle. There are a variety of ways this can be accomplished. For example, the resilient deflection member 90 can be two shot molded directly to the lens 70 or lamp housing 62 whereby the lamp housing 62 or lens 70 is molded first and the resilient deflection member 90 is molded second. Adhesion between the two is achieved by a continuous overlap or butt joint wherein the hot melt of the second shot bonds to the material of the first shot. Such a sealed joint is shown in FIG. 5 at 96. Alternatively, the resilient deflection member 90 can be insert molded using a similar process to the one described above, but using separate injection molding machines.

The resilient deflection member 90, lamp housing 62, and lens 70 can also be molded separately and thereafter bonded together, mechanically or adhesively, for example, as a sealed joint 95 depicted in FIG. 5. A person skilled in the art will know the many various ways the resilient deflection member 90 can be attached to the lens 70 and lamp housing 62 to achieve a sealed arrangement.

In another method for maintaining the integrity of the headlamp system 60, one or more vents (not shown) may be incorporated into the headlamp system 60. These vents can have filters installed in the air passage to prevent dust and debris from entering the headlamp system 60. The vents allow air circulation between the cavity of the headlamp system 60 and portions external thereto, thus relieving pressure buildup from air expansion due to the heat of the light source. Additionally, the vents help to clear any condensation that may occur on the lens. The vents also serve to evacuate large volumes of air in the headlamp system 60 during rapid impact and deformation, and allow air to reenter the headlamp system 60 upon the lens and cavity returning to their original positions. The vents can be a significant component of the invention on large volume displacements, where the vents may be specifically for the evacuation and reentry functions. In one such contemplated design, vents may have a diameter opening of approximately 3/8$^{th}$ inch. One skilled in the art will recognize that vents may be configured, implemented, and utilized in a variety of ways with regard to the present invention.

Shown in an alternate embodiment in FIG. 6, and again to permit the lens 70 to move rearward upon impact without damage to itself or any other component of the headlamp system 60, there is provided the resilient deflection member 90 between the lower portion 72 of the lens 70 and the lamp housing 62. The resilient deflection member 90 attaches to the lower portion 72 of the lens 70 as well as to the forwardly-extending portion 62b of the lamp housing 62 in a sealed manner, as described above. The lens 70 extends in an upward direction and away from the front bumper assembly 85, under the a hood 82 (and the fascia, not shown, associated therewith), and the upper portion 71 of the lens 70 attaches to the forwardly-extending portion 62b of the lamp housing 62. A clearance, for example 10 millimeters, generally exists between the lens 70 and the hood 82 to accommodate the overslam thereof.

Figure 6A:
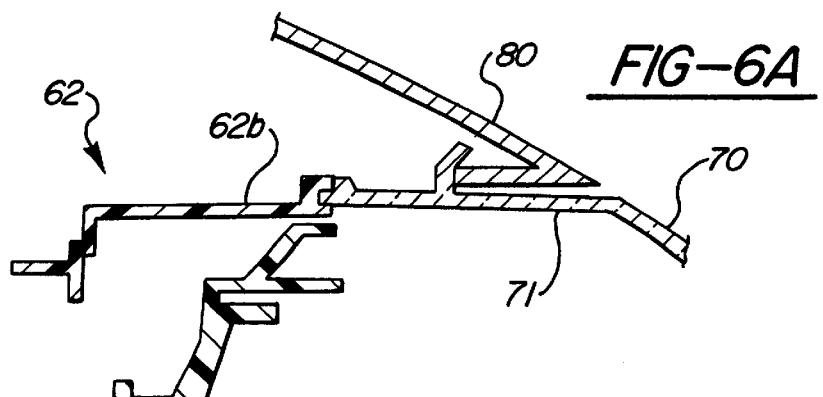
FIG. 6A illustrates an alternate arrangement of the components of the invention shown in FIG. 6, wherein the lens is installed so as to enhance the aesthetic effect of the gap between the lens and the front end exterior panel.

As an alternate arrangement of the components shown in the FIG. 6, it can be seen in FIG. 6A that the upper portion 71 of the lens 70 may be installed behind the fascia 80 and that the upper portion 71 of the lens 70 stills attaches to the forwardly-extending portion 62b of the lamp housing 62. This arrangement allows the lens 70 to be neatly oriented to the fascia 80, thereby eliminating unsightly gaps between the fascia 80 and the lens 70.

As shown in FIGS. 5 and 6, the headlamp system 60 can be rigidly attached to portions of the body 84 of the automobile or underbody components of the vehicle. Additional support can be obtained in those applications where the lens 70 is directly attached to the surrounding fascia 80 or body panels (not shown) surrounding the lens 70. Any suitable fastening device may be used, though consideration must be made for the requirement that the headlamp system must be resistant to wind and vibration forces generated when the automobile is in motion. With respect to the lamp housing 62 and lens 70 it will be readily apparent to those skilled in the art that any one portion of the lamp housing 62 or the lens 70 (support for lens 70 being only the resilient deflection member 90) could be formed to provide a plurality of reduced cross sections so as to provide a plurality of specifically located elastically deformable regions in any one of these components. As such, these components would singularly or collectively with their attaching points to the vehicle allow resilient deformation of each selective structural component by itself or in combination with the deformation of the resilient deflection member 90 in order to accomplish the previously described objectives of this invention. This can be accomplished by selectively controlling the resilient deformation and geometry of only the lens 70 or alternatively the lens 70 in combination with the resilient deflection member 90 and the material flex modulus of any one of the components including the resilient deflection member 90. Although the preferred embodiment does not contemplate the use of a reduced section modulus on any component, such alternative is clearly contemplated for specific vehicle applications.

For purposes of illustration, the section modulus I/c for the lens 70, resilient deflection member 90 and lamp housing 62 if chosen to be a rectangular cross section is $$bh^2/6,$$

where $$I=bh^3/12,$$

$$c=h/2,$$

b is the vertical thickness of the member and h is the horizontal depth of the member in the plane of the impact force. By substituting this value within the previously described relationship for maximum stress noted above, it can be seen that a decrease in the depth h of any rectangular member produces an increase in the maximum stress in any such member according to the equation:

$$S=6M/hb^2$$

Now with reference to the deflection equation noted above, and noting again that $I=bh^3/12$, the relationship between the depth h and the deflection f can be represented by the formula:

$$f=12Pl^3/Mebh^3$$

wherein a decrease in the depth h of any such member produces an increase in the measurable deflections in the member, given a constant deflection load P, beam span l, and thickness b. However, by combining the above equations, it can also be seen that:

$$f/S=2Pl^3/hMEm$$

wherein a decrease in the depth h of the member produces a proportional increase in the deflection to stress ratio f/S given a constant bending moment M, deflection load P and beam span l. Thus, with a reduced section modulus there can be additional deflection within any such member while remaining within a predetermined stress limit, such as the maximum yield strength of the material of the lamp housing 62.

Obviously, the bending characteristics predicted from the above calculation will be affected by any additional structural members of the various components of the lamp housing 62. Accordingly, the analytical discussion above is merely intended to illustrate the beneficial additional influence that a reduced section modulus has on the headlamp system's bending characteristics according to the preferred embodiment of the present invention.

Figure 7:
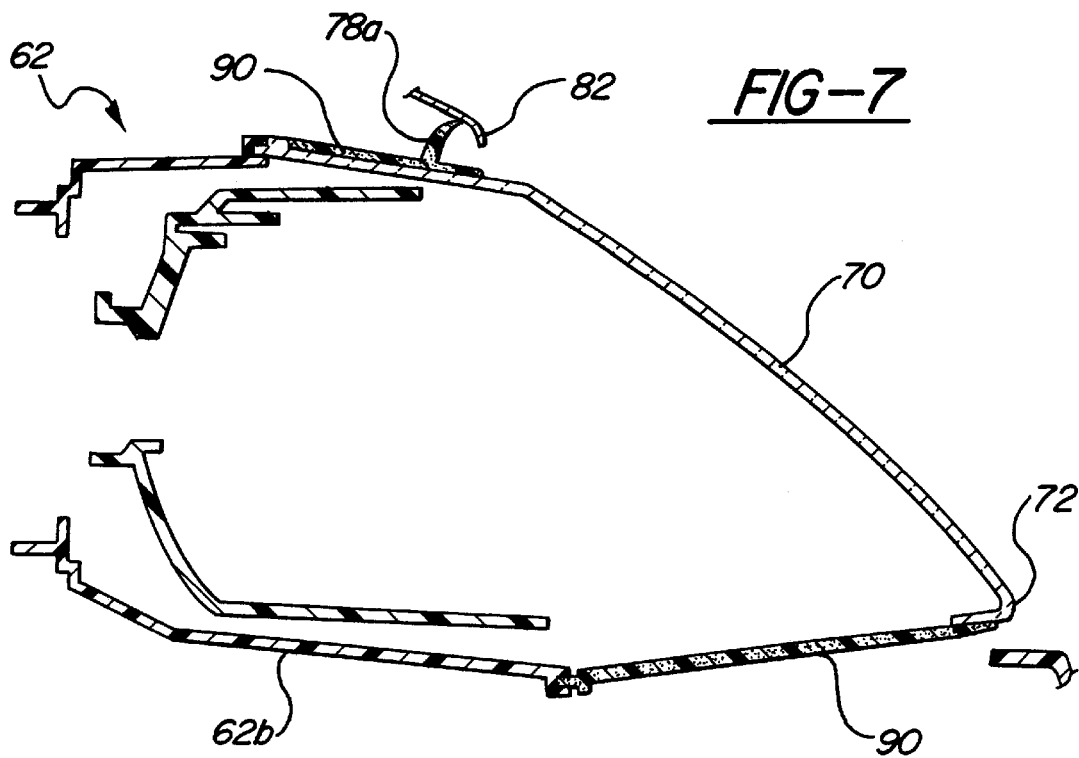
FIG. 7 is a cross-sectional view of the major components of the headlamp assembly of an alternate embodiment of the invention wherein the flex material of the headlamp system is integrated with a gimp and molded to the lens.

FIG. 7 illustrates an alternate embodiment of the current invention that incorporates a gimp 78a to eliminate visual gaps between the headlamp system 60 and surrounding components, e.g., the hood 82, and to reduce the wind noise associated therewith. The gimp 78a is molded with the resilient deflection member 90, and usually includes some flexible characteristics to accommodate an overslam of the hood 82. The gimp 78a is located between the resilient deflection member 90 and the hood 82. In this embodiment, and due to the non-flexible characteristics of the lens 70, the resilient deflection member 90 to which the gimp 78a is molded may serve as an implementation device for the gimp 78a, as well as a damage control device during bumper impacts.

Figure 8:
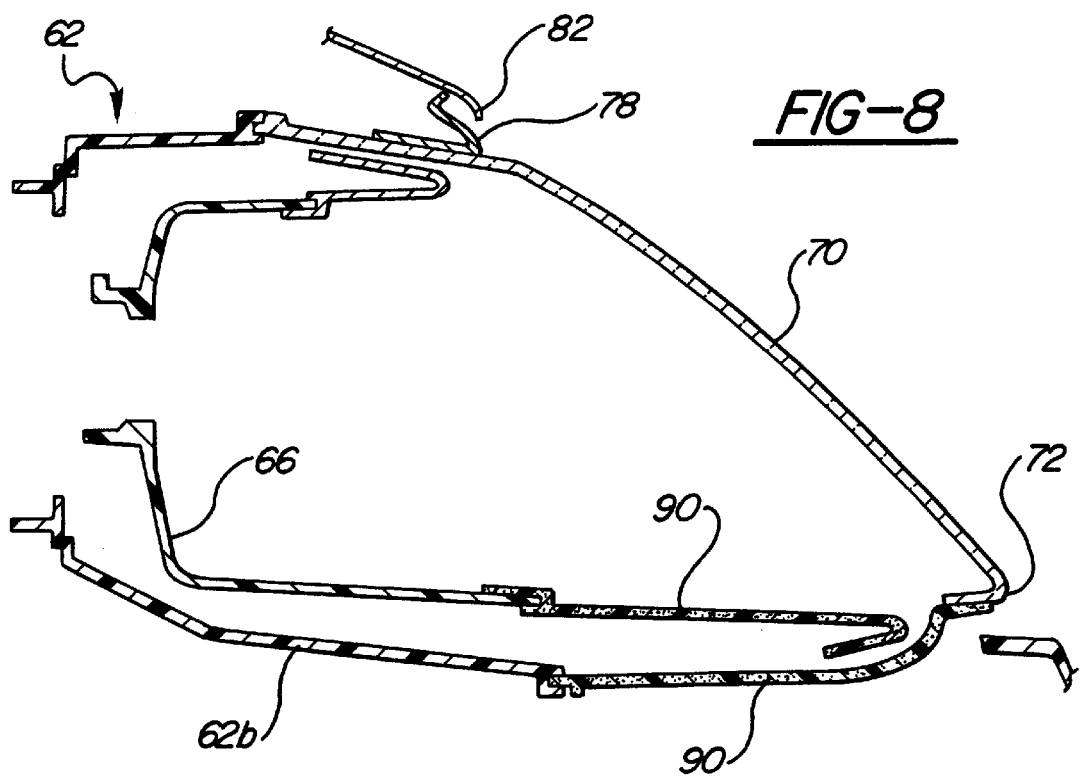
FIG. 8 is a cross-sectional view of the major components of the lamp assembly of an alternate embodiment of the invention wherein the flex material is molded with the lens and additional flex material is bonded to the reflector as a decorative bezel.

In another embodiment illustrated in FIG. 8, the headlamp system 60 includes at least two resilient deflection members 90. The first resilient deflection member is located between the forwardly-extending portion 62b of the lamp housing 62 and the lower portion 72 of the lens 70 to function in a manner similar to that described in the preferred embodiment shown in FIG. 5. The lens 70 interacts with the gimp 78 and the hood 82 to eliminate visual gaps and reduce the wind noise associated therewith. A second resilient deflection member 90 is attached to the reflector member 66 to accommodate the lens retraction rearward during an impact as well as create a bright chrome look, thus hiding from view the objectionable black void that is clearly visible in prior art headlamp assemblies. The aesthetic characteristics of the resilient deflection member 90 attached to the reflector member 66 are achieved through the use of any material that can be vacuum-metallized and that flexes during impact.

Figure 9:
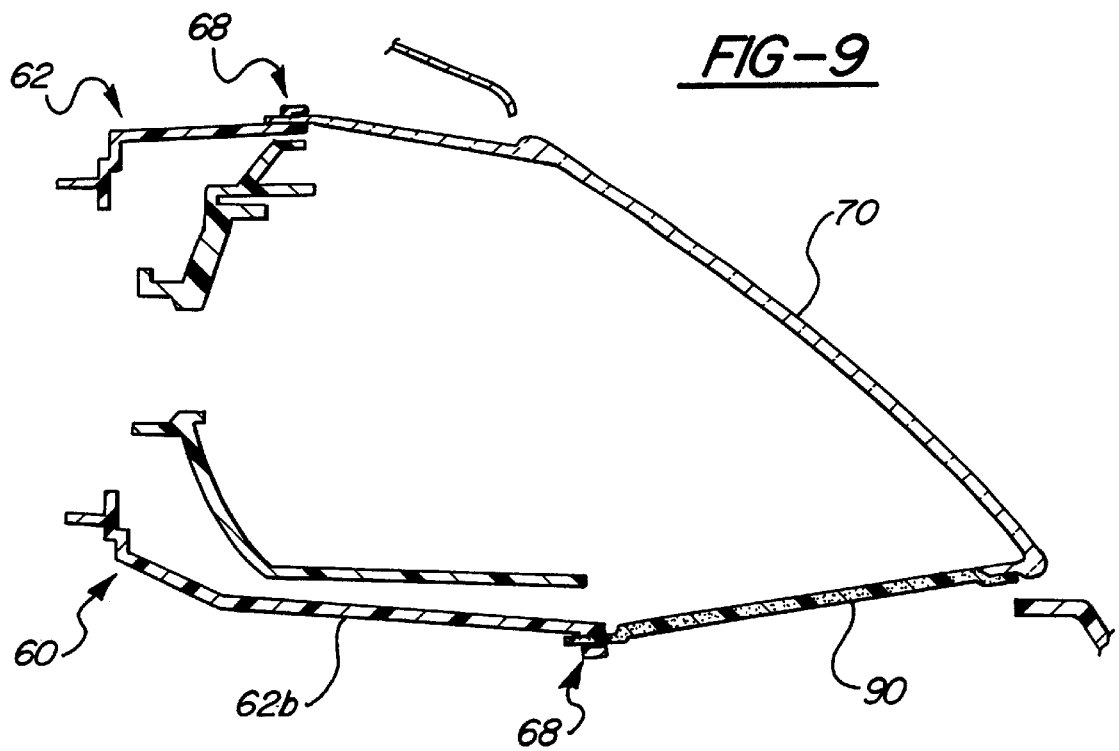
FIG. 9 is a cross-sectional view of the major components of the lamp assembly of an alternate embodiment of the invention wherein the flex material of the invention is molded to the snap-on lens and both the lens and the flex material utilize a snap-through track to attach to the housing of the headlamp assembly.
Figure 10:
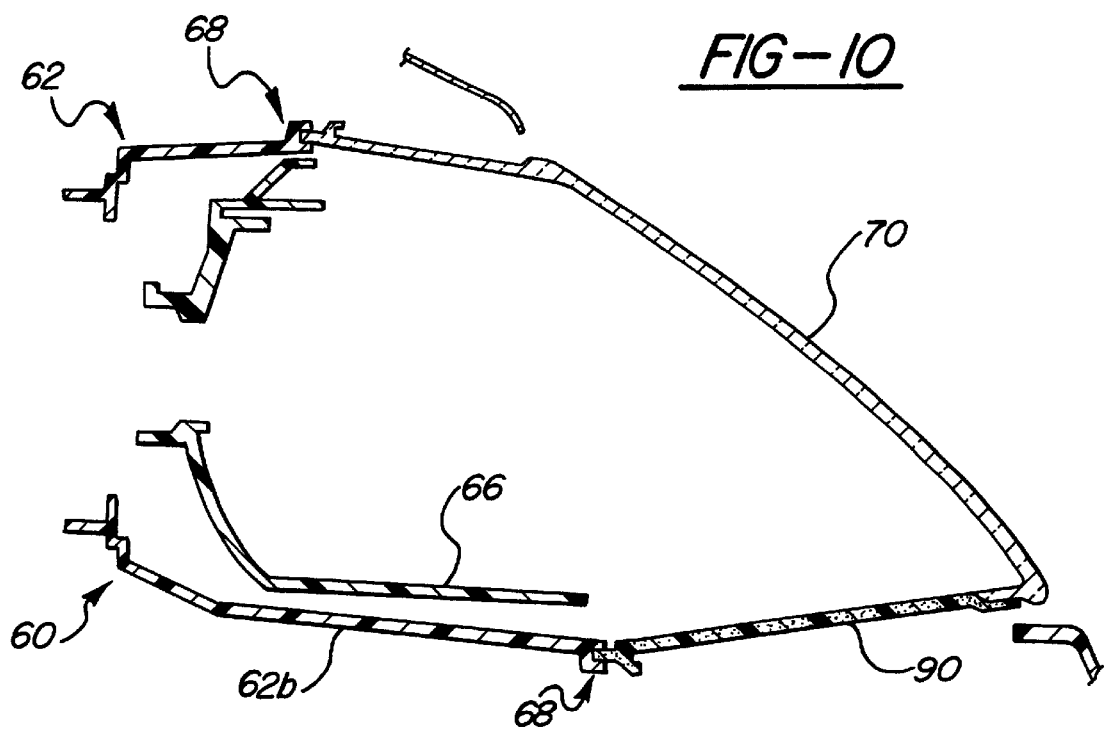
FIG. 10 is a cross-sectional view of the major components of the lamp assembly of an alternate embodiment of the invention wherein the flex material of the invention is molded to the snap-on lens and both the lens and the flex material utilize a snap-through tab to attach to the headlamp assembly.

FIGS. 9 and 10 illustrate another embodiment of the invention. The cost and effort required to replace the lens 70 and/or the resilient deflection member 90 after impact can be reduced via use of a snap-on lens and resilient deflection member combination. FIG. 9 depicts an embodiment whereby attachment members 68 of the lamp housing 62 are implemented as snap-through tracks. In this implementation, the lens 70 snaps through the attachment member 68 at one end of the lamp housing 62, while the resilient deflection member 90 snaps through the attachment member 68 at the other end of the lamp housing 62. Similarly, and as shown in FIG. 10, the attachment members 68 of the lamp housing may be implemented as snap-through tabs, whereby a replacement lens 70 and its associated resilient deflection member 90 may be readily replaced in service because it snaps onto the headlamp system 60.

Figure 11A:
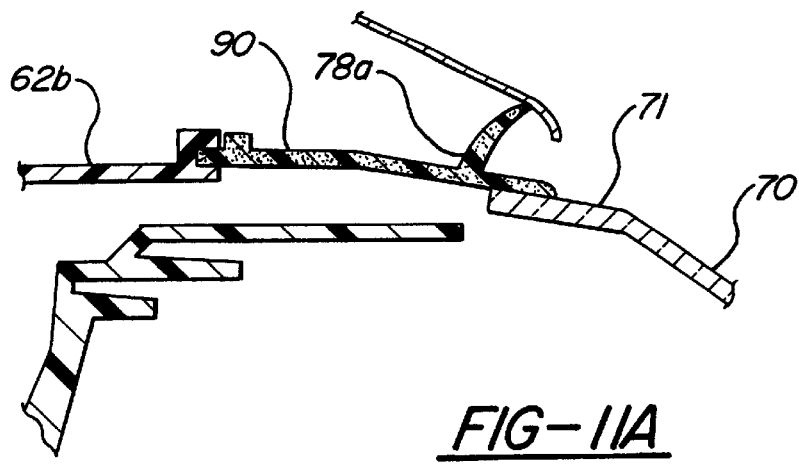
FIG. 11A illustrates an alternate arrangement of the components of the invention shown in FIG. 11, wherein the flex material is integrated with a gimp.
Figure 11:
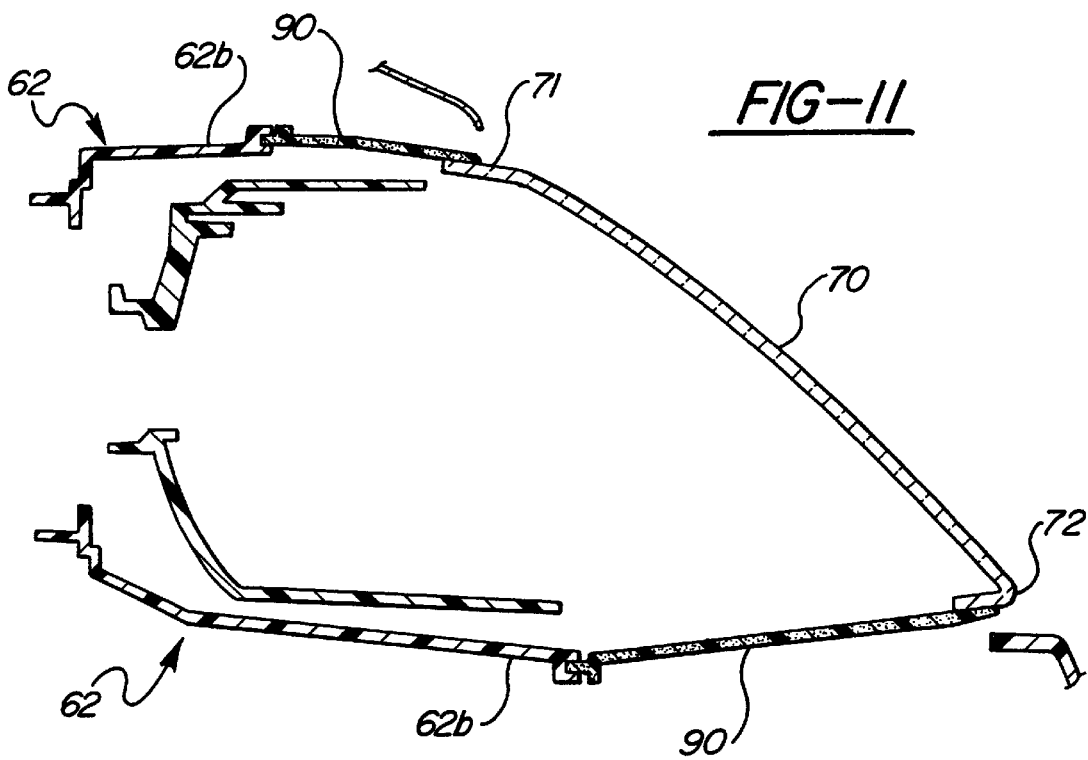
FIG. 11 is a cross-sectional view of the major components of the lamp assembly of an alternate embodiment of the invention wherein the flex material is molded all around the lens.

Further, as shown in FIG. 11, an alternate embodiment is contemplated whereby two resilient deflection members 90 may be molded, via the aforementioned molding techniques or others, to the lens 70. One resilient deflection member 90 attaches to one end of the lamp housing 62 and is molded to the upper portion 71 of the lens 70. Additionally, a second resilient deflection member 90 attaches to the other end of the lamp housing 62 and is molded to the lower portion 72 of the lens 70. When the arrangement of the components shown in FIG. 11 is modified (as shown in FIG. 11A), this embodiment includes the gimp 78a as described in FIG. 7 incorporated with the resilient deflection member 90 attached to the upper portion 71 of the lens 70 for purposes of visually closing out gaps or sealing out wind noise. The gimp 78a may be made from the same flexible material as the associated resilient deflection member 90, and manufactured using a two shot or a three shot molding process.

Figure 12A:
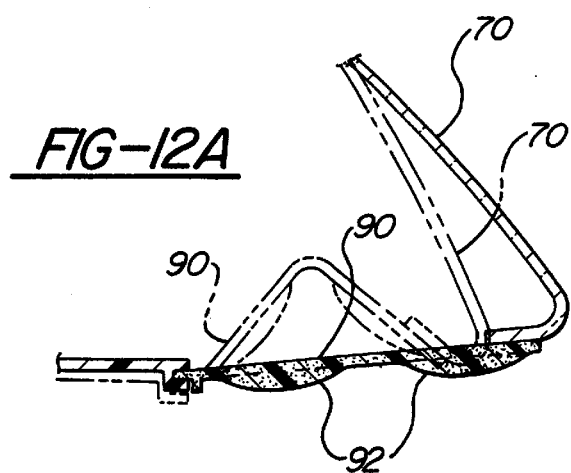
FIG. 12A is a fragmented cross-sectional view of an alternate arrangement of the components of the invention shown in FIG. 12, wherein the flex material molded with the lens contains molded gussets to predefine folds.
Figure 12B:
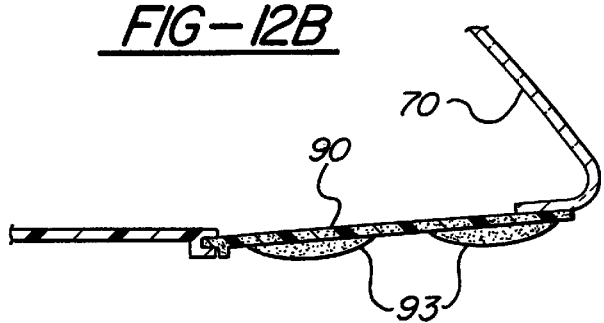
FIG. 12B is a fragmented cross-sectional view of an alternate selection of the components shown in FIG. 12, wherein additional material is laminated to the flex material while in the mold to predefine folds in the flex material.
Figure 12:
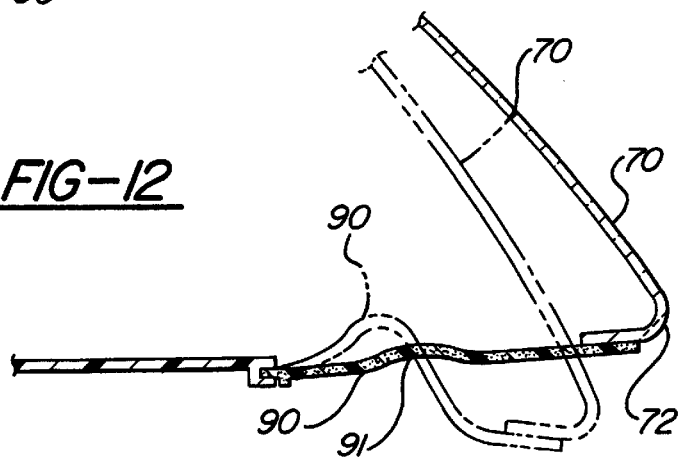
FIG. 12 is a cross-sectional view of the major components of the lamp assembly of an alternate embodiment of the invention wherein the flex material containing an indentation to predefine a fold during impact is molded to the lens.

FIGS. 12, 12A, and 12B illustrate alternate embodiments of the present invention. In FIG. 12, an area of the resilient deflection member 90 is molded with a predefined indentation 91 to carefully control the deflection action during an impact. FIG. 12 shows in solid lines such an indentation 91 in the resilient deflection member 90 attached to the lower portion 72 of the lens 70 prior to impact. The phantom lines in FIG. 12 illustrate the indentation 91, the lens 70 and the position of the resilient deflection member 90 during an impact.

An alternate arrangement of the components shown in FIG. 12 is shown in FIG. 12A. As shown, FIG. 12A depicts an embodiment that utilizes gussets 92 molded with the resilient deflection member 90 to predefine the area and direction of fold of the resilient deflection member 90 prior to impact. The fold in the resilient deflection member 90 as directed by the gussets 92 when under the force of an impact is depicted in phantom.

FIG. 12B shows yet another possible configuration of the components shown in FIG. 12. In this embodiment, the resilient deflection member 90 has additional flexible material 93 laminated thereto for purposes of easing and directing the fold of the resilient deflection member 90 during an impact. Any material suitable for the purpose described may be used. It is contemplated within the use of this particular embodiment, although it is described with additional laminated material, the resilient deflection member could also be made by providing in the mold an area of increased thickness at the area 93 indicated in FIG. 12B.

Additionally, one skilled in the art will recognize that the function of directing the fold of the resilient deflection member 90 during impact may be accomplished in various ways, including the use of reinforcing ribs, darts, or the like with the resilient deflection member 90; various thicknesses in the resilient deflection member 90; and/or the use of a composite of materials with different flex moduli selectively laminated or two shot molded together.

FIG. 13 illustrates a dual lens headlamp system 60 that utilizes a lens within a lens for aesthetic purposes. In this assembly, an inner lens 73 controls an aim pattern of a light source, while the lens 70 permits the light source to pass therethrough. In accordance with the present invention, this headlamp assembly also utilizes the resilient deflection member 90. It is contemplated that the resilient deflection member 90 is attached to the forwardly-extending portion 62b of the lamp housing 62 and to the lower portion 72 of the lens 70 such that it would function as previously described to prevent damage to the headlamp system 60 during impact. Further, it is contemplated that the resilient deflection member 90 in a dual lens system such as the one depicted in FIG. 13 would function as previously described to ensure the proper positioning of the lens 70 after an impact, thus preventing the lens 70 from negatively interfering with the light source.

Figure 14:
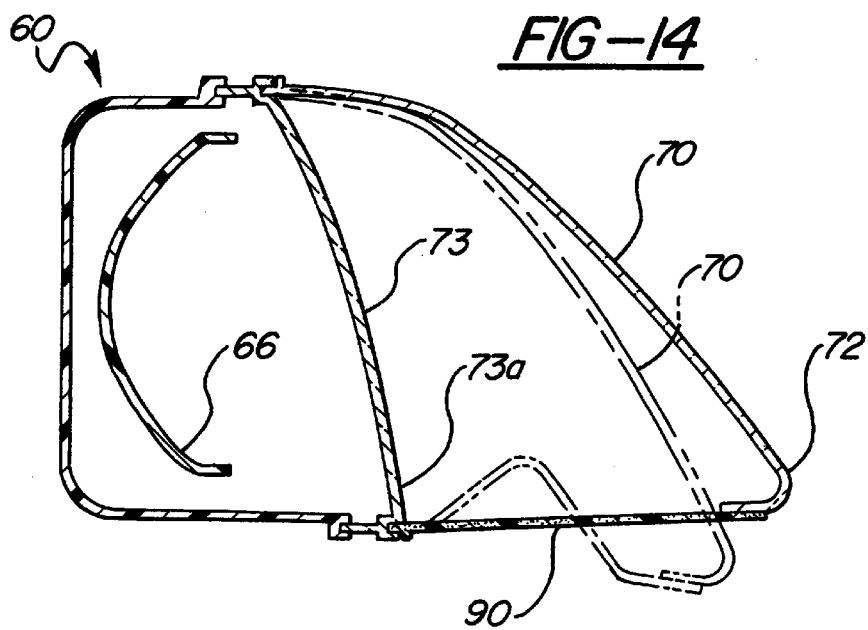
FIG. 14 is a cross-sectional view of the major components of the assembly of an alternate embodiment of the invention having an inner and outer lens wherein the flex material is located between the inner lens and the outer lens.

FIG. 14 is an illustration of an alternate embodiment of a dual lens headlamp system 60 wherein the solid lines show the reflector member 66 that directs an aim pattern from a light source, the inner lens 73 that acts as a shield for the reflector member 66, and includes the lens 70 for light pass-through and aesthetics. The resilient deflection member 90 is attached to a lower end 73a of the inner lens 73 and the lower portion 72 of the lens 70. The fold of the resilient deflection member 90 during impact is depicted in phantom.

Figure 15:
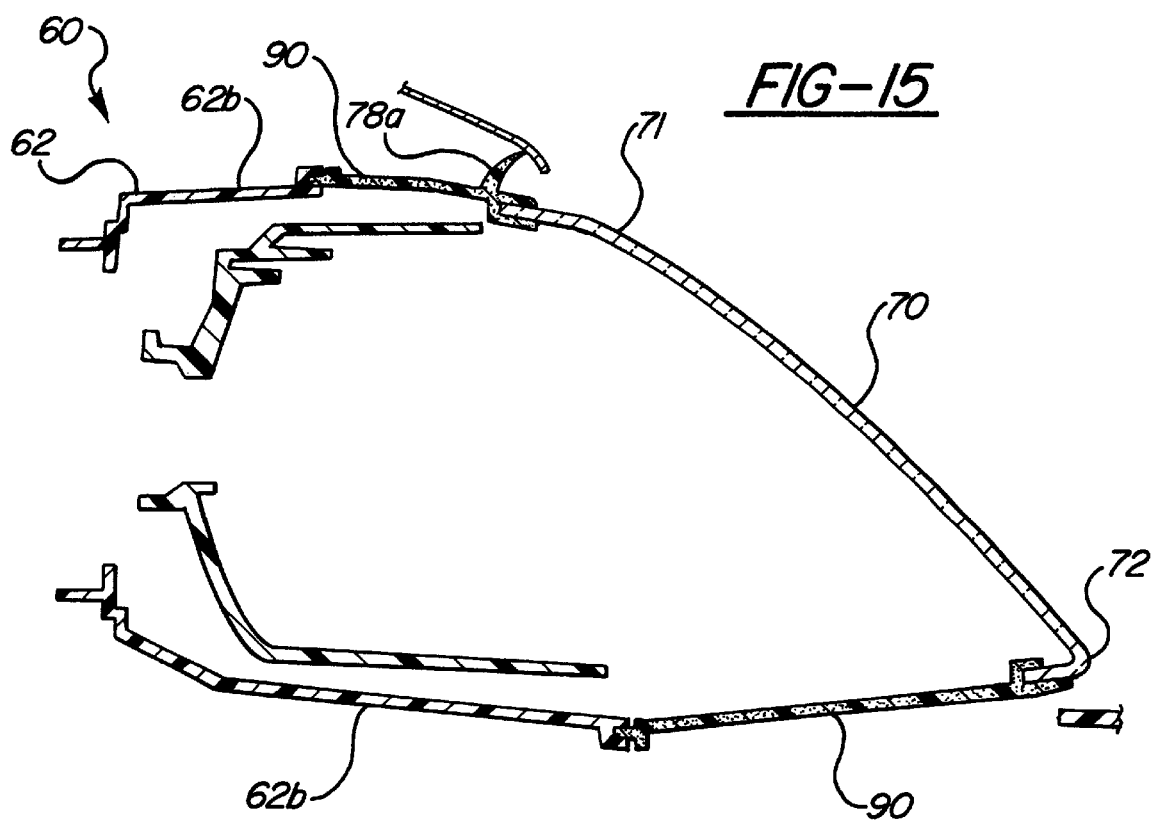
FIG. 15 is a cross-sectional view of the major components of the lamp assembly of an alternate embodiment of the invention wherein the flex material is integrated with a gimp and bonded to the lens.

FIG. 15 illustrates an embodiment of the current invention utilizing attachment means of the resilient deflection member 90 other than the previously mentioned molding techniques to bond the resilient deflection member 90 to the components of the headlamp system 60. The resilient deflection member 90 is bonded in any suitable manner to the forwardly-extending portion 62b of the lamp housing 62 and the upper portion 71 and the lower portion 72 of the lens 70 either mechanically or by adhesion, sealant, or the like as would be recognized by one skilled in the art. The resilient deflection member 90 incorporates the gimp 78a as described in FIGS. 7 and 11A for purposes of visually closing out gaps or sealing out wind noise. The gimp 78a may be made from the same flexible material as the associated resilient deflection member 90, and manufactured using a two shot or a three shot molding process.

As shown in FIG. 16, in yet another embodiment, the resilient deflection member 90 of the headlamp system 60 is the entire lens 70 itself. As shown in solid lines, the upper portion 71 and lower portion 72 of the lens 70 are attached to the forwardly-extending portion 62b of the lamp housing 62. During bumper impact, the resilient deflection member 90 or the lens 70 resiliently deforms (shown in phantom), and returns to its initial position within the headlamp system 60 without any detrimental effect on the optical characteristics of the resilient deflection member 90 or the lens 70 itself. As previously mentioned, FEA may be used to determine the optimal yield strength, degree of deformity, or other design particulars of the resilient deflection member 90 and the remaining components of the headlamp system 60.

One skilled in the art will recognize that the resilient deflection member 90 as the lens 70 itself as shown in FIG. 16 may be implemented in various forms. Further, many processes for the fabrication of the resilient deflection member 90 can be used. In one variation, the resilient deflection member 90 or the lens 70 is fabricated from a flexible material and achieves a thickness of 1.5 mm. One approach to fabricate the lens 70 is to form the lens material from a thin sheet of polycarbonate plastic and thermoform the lens 70 to the desired contour and optical criteria. Another method to generate the lens 70 is to extrude thin sheet stock, thermoform the lens shape, and trim the offal. Thicknesses as low as 0.040 of an inch would be achievable with this approach. Another approach to fabricate the lens is an injection/compression mold process. In this process, the mold is partially filled with the die indexed slightly open. After partially filling the mold, it is indexed closed compressing and squeezing out the molten material and netting a thinner part than is normally possible with straight injection molding. Yet another approach uses a thin wall molding technique to create a thin lens. In this process, an injection molding machine injects material into a thin wall cavity using extremely high pressures and speeds, resulting in higher clamp torque than normal. Additionally, the resilient deflection member 90 could be molded with a localized area to ease and direct the folding action during an impact, as described with reference to FIGS. 12, 12A, and 12B. The use of a lower flex modulus optically clear material like TPU for reinforcing ribs, darts, or variations in thickness with respect to the resilient deflection member 90 could also achieve this same function. Further, a composite consisting of different flex moduli materials selectively laminated or two shot molded together could also achieve this result.

Figure 17:
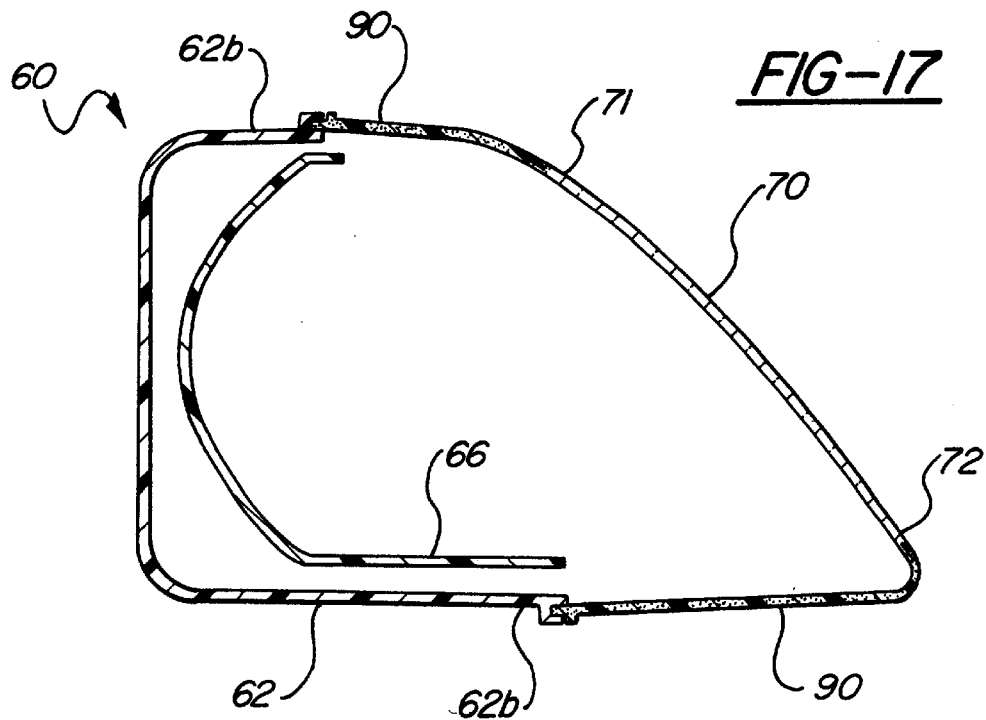
FIG. 17 is a cross-sectional view of the major components of the lamp assembly of an alternate embodiment of the invention wherein a lens of a clear material is inserted into an opaque flex material or a flex material of a color similar to the color of the body of the vehicle.

FIG. 17 illustrates an alternative embodiment wherein the headlamp system 60 is designed to aesthetically blend with the surrounding body components on the vehicle (not shown). The resilient deflection member 90 is attached to the upper portion 71 and the lower portion 72 of the lens 70, and to the forwardly-extending portion 62b of the lamp housing 62. The lens 70 is formed from a material having a clear or transparent quality. The resilient deflection member 90 is formed from a material having a color that matches the color of the body of the vehicle, not shown, or a material having an opaque quality. Alternatively, the lens 70 itself could be designed and implemented in the headlamp system 60 as a resilient deflection member, similar to aforedescribed lens 70 in FIG. 16.

Figure 18:
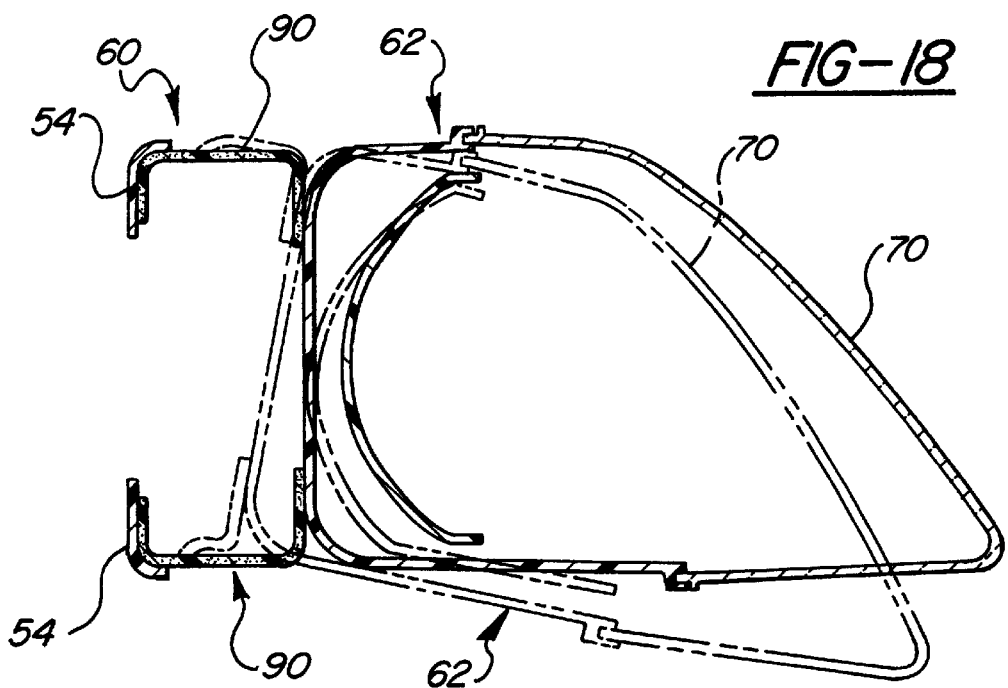
FIG. 18 is a cross-sectional view of the major components of the lamp assembly of an alternate embodiment of the invention wherein the flex material is located between the vehicle body, vehicle body member, or grille opening reinforcement and the headlamp housing.

The location of the resilient deflection member 90 is variable with respect to the components of the headlamp system 60. In yet another embodiment shown in FIG. 18, the headlamp system 60 is configured with the resilient deflection member 90 between the lamp housing 62 and either the body structure or a body member of the vehicle (not shown). As illustrated in solid lines, the resilient deflection member 90 is attached to the lamp housing 62 in any suitable manner, and is attached to a predetermined portion of the vehicle body, a support member, or other component (such as a grille opening reinforcement 54 shown in FIG. 18) in an appropriate manner, such as with screws or by welding, thus forming the headlamp system 60 of the present invention. The deflection position of the headlamp system 60 during impact, wherein the resilient deflection member 90 absorbs most of the impact and returns the headlamp system 60 to its pre-impact position without damage thereto, is illustrated in phantom.

The influence on the headlamp system 60 of the preferred embodiment of a low speed bumper impact is illustrated in FIG. 19. FIG. 19 shows a partial cross-sectional side view of the headlamp system 60 in which the resilient deformation of the headlamp system 60 can be seen to be localized by the resilient deflection member 90 with no effect on the lamp housing 62 and minimal effect on the lens 70. According to the teachings of the present invention it is contemplated that the deformation of the headlamp housing is controlled within the yield limit of the material itself by providing a material with a preselected flex modulus and, if necessary, enhancing the deflection by a reduced section modulus, so as to assist in absorbing the force of the impact, if desirable or practicable based on the space availability for accommodating the deflection of the resilient deflection member within its yield limit. This choice is completely dependent on the specific application on a vehicle considering the degree of elasticity provided by the deformation of the resilient deflection member 90 and the lens 70 so as to partially deform without exceeding its yield limit during the stroke of the front bumper assembly 85, as shown, remaining flush with the bumper fascia 85*a* at both pre-impact (FIG. 5) and post-impact positions. Accordingly, it may be desirable to provide the lens 70 with structural modification, i.e., reduced section modulus over and above its deflection characteristics due to the flex modulus of the material, so as to provide elastic deformation due to impact yet no visible structural effect upon post-impact inspection. If so required, the specific design of the resilient deflection member 90 must allow the headlamp system 60 to return to its original position after impact force to ensure continuing optical function of the lens 70.

An alternate embodiment that achieves the smooth hoodline transition described above is illustrated in FIG. 20. Here, the headlamp system 60 interacts with the fascia 80 associated with the hood (not shown) and with the fascia 85*a* associated with the front bumper assembly 85 to visually close out gaps, reduce the wind noise associated therewith, and present a smooth, continuous interaction among the components surrounding the headlamp system 60. In this embodiment, the upper portion 71 of the lens 70 is inserted into or otherwise attached to the fascia 80 associated with the exterior hood panel (not shown) and simultaneously to the forwardly-extending portion 62*b* of the lamp housing 62. The lower portion 72 of the lens 70 is inserted into or otherwise attached to the bumper fascia 85*a* associated with the front bumper assembly 85. The resilient deflection member 90 is molded or otherwise attached to the lower portion 72 of the lens 70 and to the forwardly-extending portion 62*b* of the lamp housing 62.

FIG. 21 illustrates an alternate embodiment of the present invention wherein a fog lamp assembly 105 has been brought into the impact zone of the automotive vehicle (not shown) such that upon a frontal impact on the bumper system (not shown) and its associated fascia 85*a*, the resilient deflection member 90 will resiliently deform without exceeding its yield limit to absorb the impact force and return the lens 70 of the fog lamp assembly 105 to its original pre-impact position. The front end fascia 80 and the bumper assembly fascia 85*a* of the automotive vehicle (not shown) interact with the lens 70 to present a smooth, continuous line and close out visual gaps between the aforementioned components. The resilient deflection member 90 is attached to the lens 70 and to the forwardly-extending portion 62*b* of the lamp housing 62 as earlier described.

Figure 22:
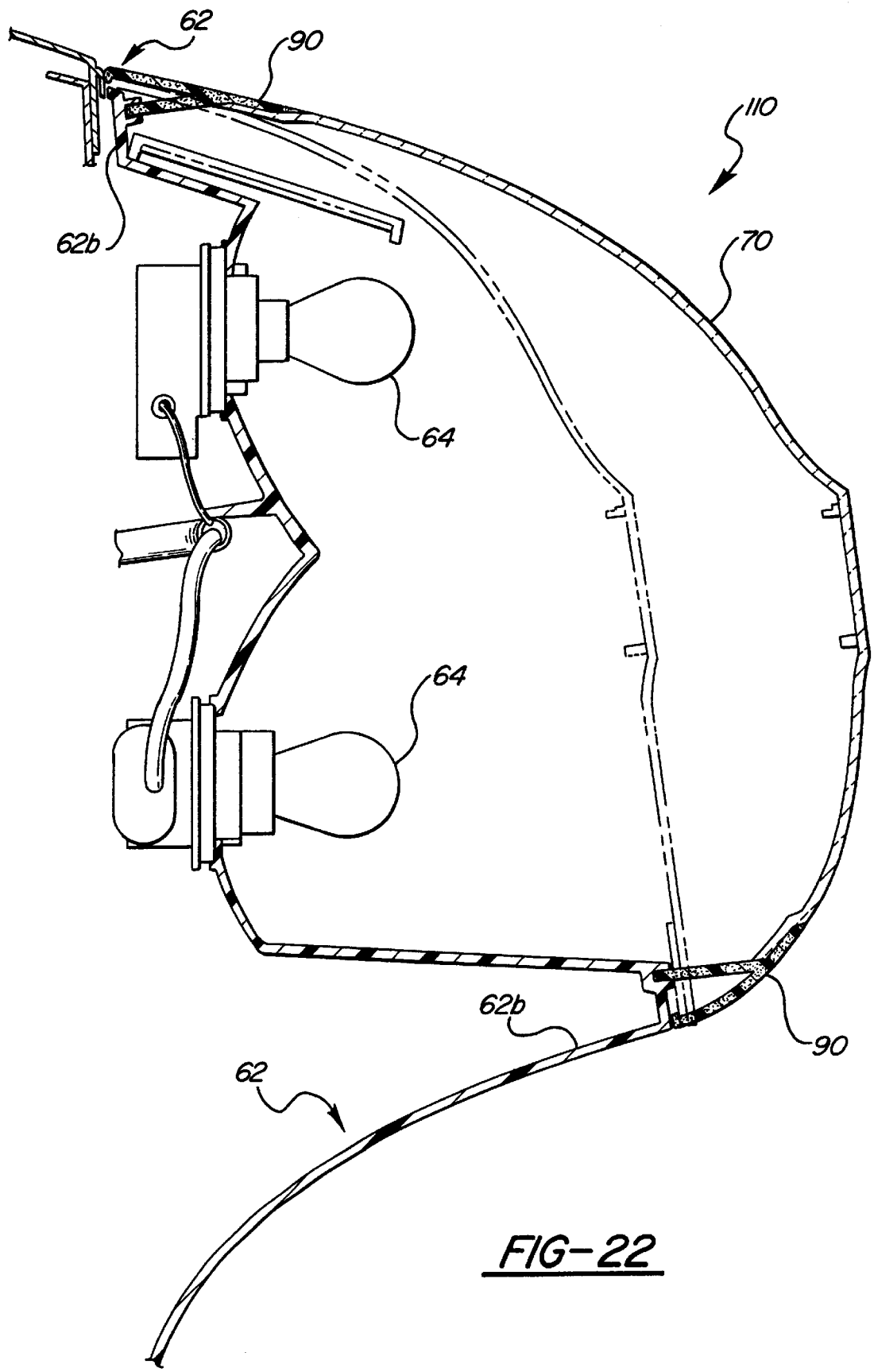
FIG. 22 is a plan view partially in cross-section of the major components of a taillamp assembly, according to the present invention, having a dual light system wherein the flex material is molded to the lens and interacts with the housing of the taillamp assembly.
Figure 23:
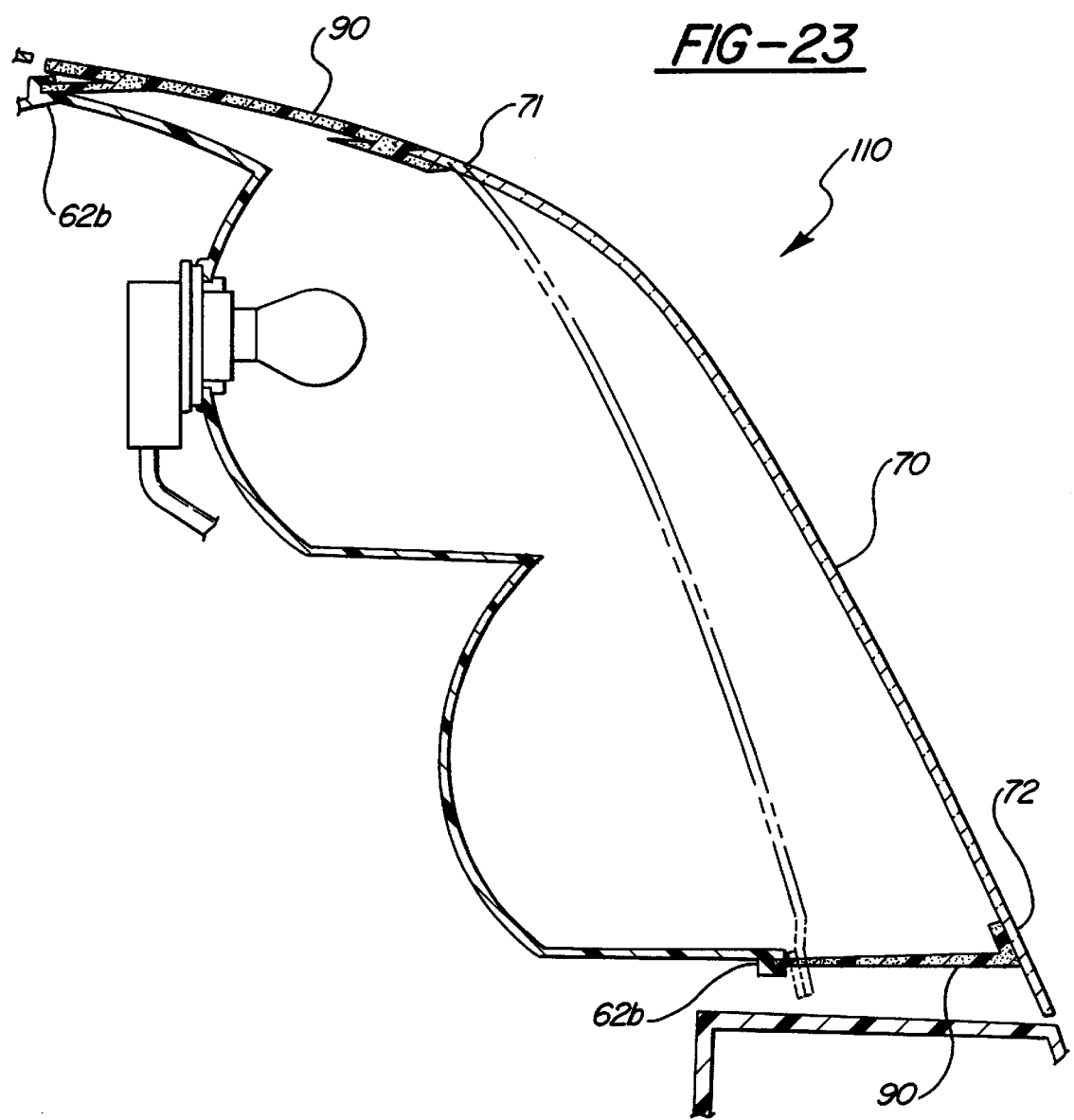
FIG. 23 is a cross-sectional view of the major components of a taillamp assembly according to the present invention wherein the flex material is attached to the housing and to the lens.
Figure 24:
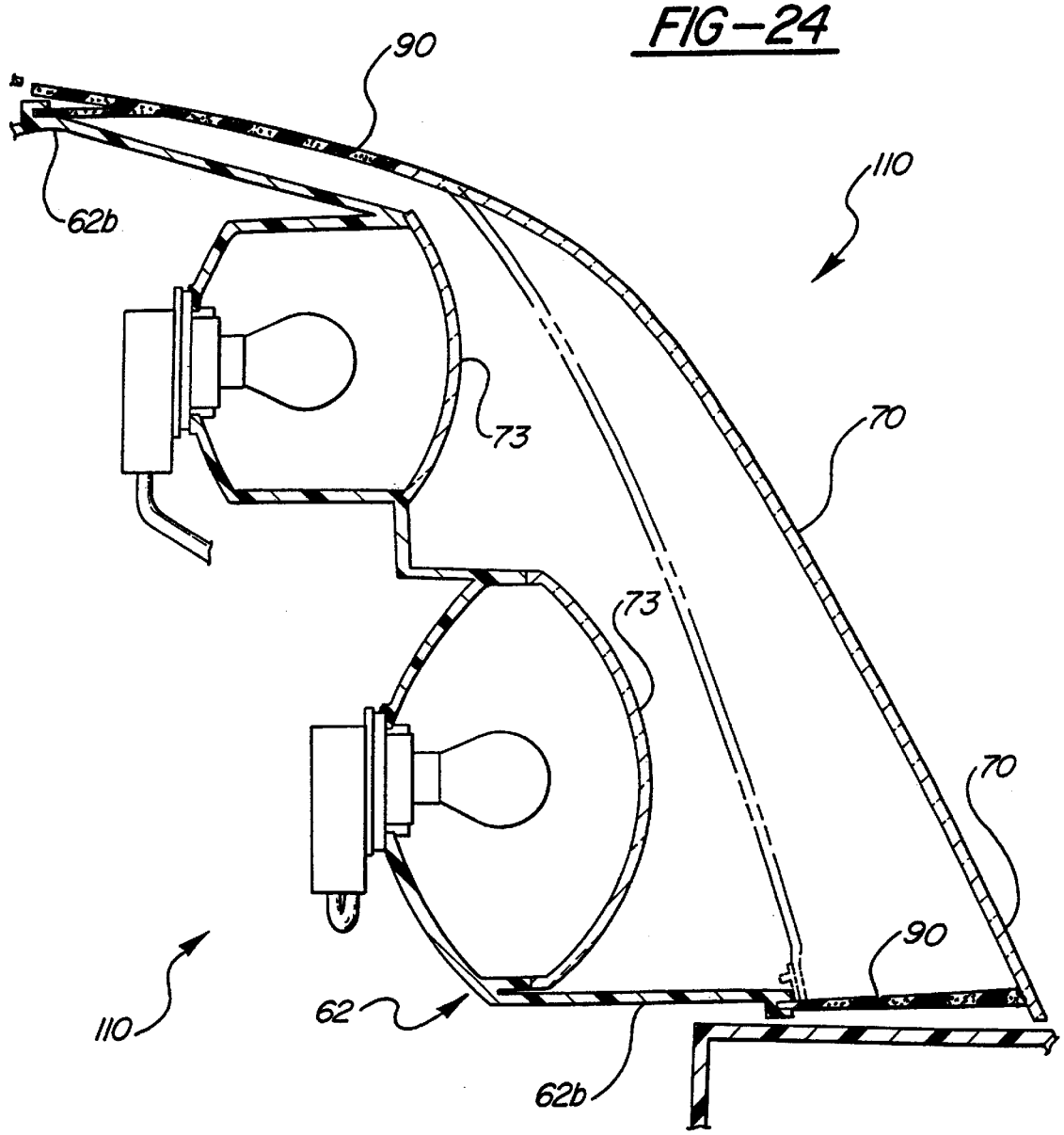
FIG. 24 is a cross-sectional view of the major components of an alternate embodiment of a taillamp assembly having a dual light system wherein the flex material is attached to the housing and to the lens.
Figure 25:
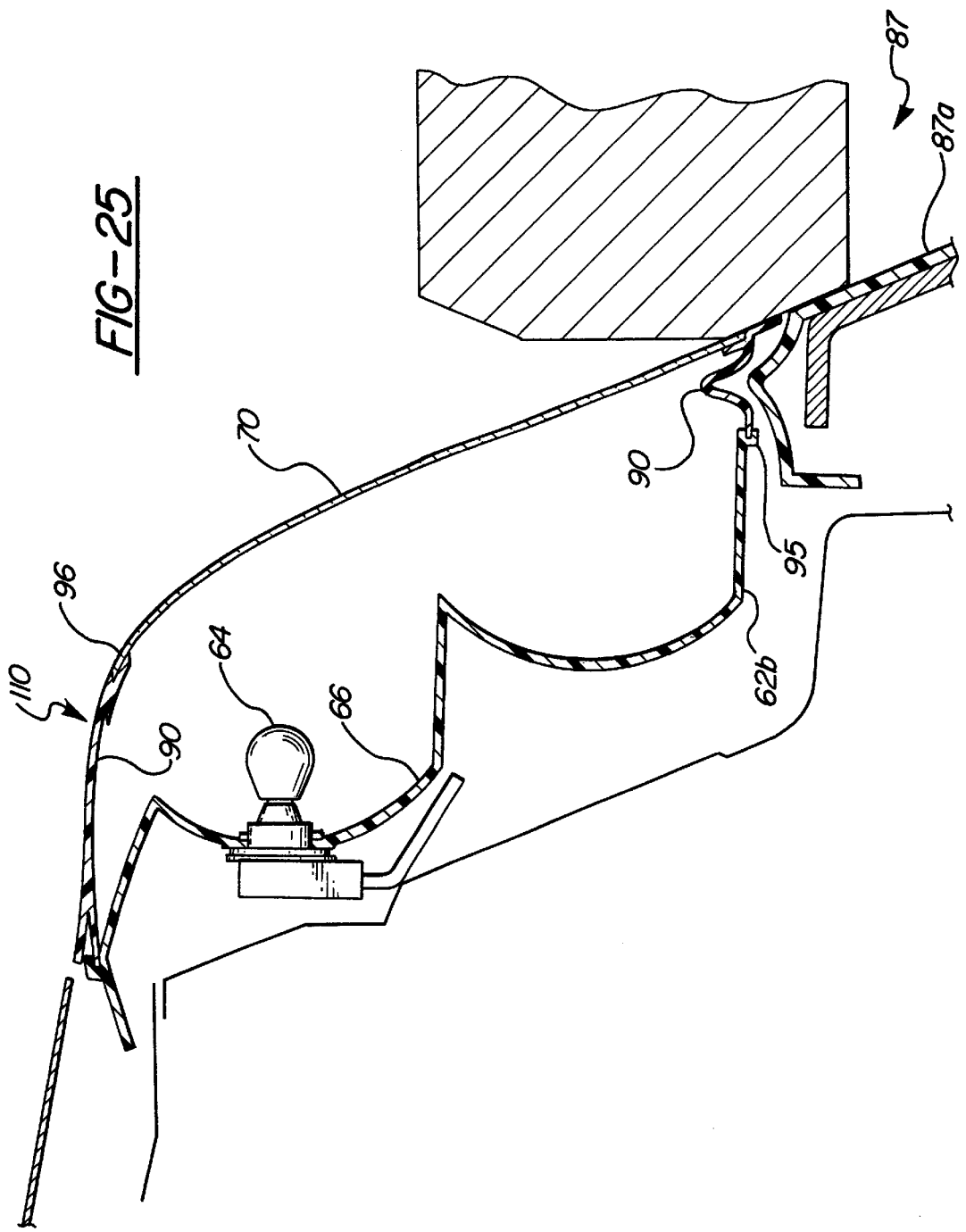
FIG. 25 is a cross-sectional view of a taillamp assembly illustrating a rear end impact with an obstacle in accordance with an alternate embodiment of this invention.

FIGS. 22 through 25 illustrate the invention as applied to a rear taillamp assembly 110. The phantom lines in FIGS. 22, 23 and 24 depict a partial concave design line of the prior art. The rear taillamp assembly 110 and its associated lens 70 has also been moved rearward from its prior art position into the impact zone of a rear bumper 87 so that as the rear bumper 87 is impacted, the rear bumper 87 and associated fascia 87*a* of the rear taillamp assembly 110 move forward with the rear bumper 87 as a result of the resilient deformation of the resilient deflection member 90 as shown in FIG. 25 to allow the taillamp assembly to return to its pre-impact position after the impact force has been removed without any structural damage thereto. As shown in FIGS. 22, 23, 24, and 25, the resilient deflection member 90 is directly molded or otherwise attached to the lens 70 of the rear taillamp assembly 110. Alternatively, the resilient deflection member 90 may be the lens 70 itself or a combination of the assembly components.

FIG. 22 illustrates an alternate embodiment of the present invention wherein the taillamp assembly 110 having a dual light system is protected from damage during an impact thereto by the resilient deflection member 90, as previously explained. The resilient deflection member 90 forms a Y-connection with the lamp housing 62 of the taillamp assembly 110 because the reflector housing is integral with the lamp housing 62. The resilient deflection member is also molded to the lens 70, to form a continuous contour about a rear corner of the automotive vehicle (not shown). Alternatively, either the entire lamp housing or a portion of the lamp housing 62, such as the forwardly-extending portion 62*b*, may also be implemented as the resilient deflection member 90.

FIG. 23 is a partial cross-sectional view of the taillamp assembly 110 according to the present invention wherein the resilient deflection member 90 is molded to the upper portion 71 and attaches to the lower portion 72 of the lens 70. Alternatively, the resilient deflection member 90 may attach to the lens 70 in any appropriate manner, as earlier described herein. For example, the upper portion 71 of the lens 70 may be molded to the resilient deflection member 90 in a relationship wherein the upper portion 71 of the lens 70 extends the entire length of the resilient deflection member 90. In another variation of this embodiment, at least a portion of the forwardly-extending portion 62*b* of the housing may be a second resilient deflection member 90, or the resilient deflection member 90 may be the lens 70 itself. In FIG. 23, the resilient deflection member 90 is contemplated to form a Y-connection with at least part of the forwardly-extending portion 62*b* of the lamp housing 62, and is mechanically attached in an appropriate manner to the remainder of the forwardly-extending portion 62*b* of the lamp housing 62.

FIG. 24 is a partial cross-sectional view of an alternate embodiment of the taillamp assembly 110 having a dual light system, two inner lenses 73, and the lens 70, wherein the resilient deflection member 90 is attached or molded to the lens 70. The resilient deflection member 90 is attached to the forwardly-extending portion 62*b* of the lamp housing 62.

FIG. 25 illustrates the effect of a bumper impact on the resilient components of an alternate embodiment of the invention, as previously discussed.

FIG. 26 shows an isometric view of the resilient deflection member 90 and the attached lens 70 of the present invention, where it can be seen that the resilient deflection member 90 borders approximately 60% of the lens 70. This will obviously vary with the application.

A significant advantage of the headlamp assembly of the present invention is that the ability to select a material with a predetermined flex modulus and to consider reducing the section modulus at one or more predetermined points on the lamp housing 62, lens 70 or resilient deflection member 90 eliminates the need for the headlamp system 60 to pivot about some attachment point during the stroke of the front and rear bumper assemblies 85 and 87 due to impact, as frequently taught by some of the prior art headlamp systems. Consequently, no additional hardware or special fasteners are required between the headlamp system 60 and portions of the body and/or body of the vehicle.

As a result of the invention, the headlamp lens 70 can be mounted flush with its surrounding body panels, that is, this mounting arrangement provides aesthetically pleasing continuous smooth contour surfaces between the hood, bumper and headlamp lens surfaces. Accordingly, both the styling and aerodynamic characteristics of the vehicle front end are greatly improved.

Another significant advantage of the present invention is that the section modulus of any of the structural members of the headlamp or taillamp assembly can be readily modified for experimental purposes. As a result, the optimum section modulus for different applications can easily be experimentally ascertained by either modifying the mold that forms a member, or mechanically to contour and remove material from a member's cross section.

In some applications, the impact may scuff or damage the lens. While the resilient deflection member protects the body of the lamp from the shock impact, thus serving its intended purpose, it may require the replacement of a lens. Regulations of some countries permit replaceable lenses and although this is uncommon due to the additional assembly and design cost, this could be part of a practical solution in achieving an aggressive headlamp design that may sustain extreme impact conditions, i.e. impacts well in excess of 5 miles per hour.

Another advantageous feature of the present invention is that portions of the lamp housing or lens are frequently required to be decoratively finished with paint or vacuum metallizing. Accordingly, depending on the desired aesthetic effect of the resilient deflection member it could be implemented within the vehicle prior to decorating so that a separate operation for decorating the resilient deflection member is avoided. Further, the resilient deflection member can be decorated to provide a contrasting effect with surrounding components.

Accordingly, the present invention provides a headlamp, taillamp, fog lamp, signal lamp, or auxiliary lamp assembly that is able to withstand a predetermined impact without fracturing any of the components, by elastically deforming predetermined selected components while also being capable of supporting a movement of the headlamp, taillamp, fog lamp, or turn signal lamp forward or rearward, as desired based on the type of resilient deflection member, into the impact zone of an impact-absorbing bumper such that any preselected component of the lamp system is capable of resiliently deforming with the stroke of the bumper and returning to its pre-impact position without any damage thereto. With the resilient deflection member being the only structural component providing function of the resilient deflection member, it is readily evident that the remaining components of the lamp assembly need not be movable with the stroke of the bumper. However, the resiliency of the lens to absorb a bumper impact must be such as to return the lens to its pre-impact position with no detrimental effect to the optical characteristics of the lens (within tolerance specifications).

The present invention provides further significant advantages of better economy due to the creation of a smooth aerodynamic design of the headlamp and bumper, eliminating the boxy-shaped offsets between the bumper and the headlamps; allows additional packaging space for other vehicle components because with the lens of the headlamp system being mounted further forward, the housing can be placed further forward permitting added space in the engine compartment behind the housing; the aerodynamic design assists in creating an efficient low drag vehicle that results in less wind noise, improved handling and higher fuel efficiencies; the use of the invention on taillamps can result in increased trunk space, improved rear end aesthetics and improved aerodynamics; and the invention is an economically low cost approach to achieving relocation of the headlamps, taillamps, fog lamps and turn signal lamps into the impact zone.

While the invention has been described in terms of a preferred embodiment, it is readily apparent that the invention is readily applicable to taillamps, fog lamps, turn signal lamps or any other form of automotive exterior lamp that may be adapted by one skilled in the prior art. For example, the section modulus of the body panels surrounding the lens in the case where the lens is mounted to its surrounding fascia could be modified to provide the appropriate deflection of the lens in combination with the resiliently deformable resilient deflection member.

Further, the invention can be practiced wherein each of the components of the lamp assembly collectively contribute a resilient deformation capability such that the lamp assembly can withstand a predetermined impact without fracture thereto.

It is to be understood that the detailed description and drawings of the present invention do not describe the only embodiments of the present invention and, in fact, various modifications are obtainable without departing from the scope of the present invention, and should be taken in conjunction with the appended claims. Accordingly, the scope of the invention is to be limited only by the following claims.

What is claimed is:

1. An elastically deformable automobile lamp assembly for an automotive vehicle having at least one panel member and an impact-absorbing bumper assembly spaced from said at least one panel member, said lamp assembly comprising:
   a housing member mounted to said at least one panel member, said housing member further being located relative to said impacting-absorbing bumper assembly;
   a lens member mounted to said housing member; and
   at least one resilient deflection member interposed said lens member and said housing member, said at least one resilient deflection member having a predetermined yield strength so as to enable a predetermined elastic deformation of said lamp assembly whereby upon impact said at least one resilient deflection member does not exceed said predetermined yield strength of said at least one resilient deflection member so as to return said lamp assembly substantially to its pre-impact position without damage thereto upon removal of the impact force.

2. An elastically deformable automotive lamp assembly according to claim 1 further comprising means for sealing said housing member.

3. An elastically deformable automotive lamp assembly according to claim 2 wherein said means for sealing is located between said at least one resilient deflection member and said lens member.

4. An elastically deformable automotive lamp assembly according to claim 2 wherein said means for sealing further comprises a gimp.

5. An elastically deformable automotive lamp assembly according to claim 1 wherein said at least one resilient deflection member borders at least a portion of the periphery of said lens member.

6. An elastically deformable automotive lamp assembly according to claim 5 wherein said at least one resilient deflection member is bonded to said lens member.

7. An elastically deformable automotive lamp assembly according to claim 1 wherein a portion of said at least one resilient deflection member is molded to said lens member.

8. An elastically deformable automotive lamp assembly according to claim 1 further comprising a reflector member mounted to said housing member and a second resilient deflection member attached to said reflector member whereby said second resilient deflection member resiliently deforms under a force of an impact.

9. An elastically deformable automotive lamp assembly according to claim 1 further comprising means for removably attaching said lens member to at least one of said housing member and said at least one resilient deflection member whereby said lens member may be detached from said at least one of said housing member and said at least one resilient deflection member for replacement purposes.

10. An elastically deformable automotive lamp assembly according to claim 9 wherein said means for removably attaching further comprises at least one track member.

11. An elastically deformable automotive lamp assembly according to claim 9 wherein said means for removably attaching further comprises at least one tab member.

12. An elastically deformable automotive lamp assembly according to claim 1 wherein said at least one resilient deflection member further comprises:
  means for guiding the direction of the deformation of said at least one resilient deflection member, said means for guiding attached to said at least one resilient deflection member, whereby said means for guiding causes said at least one resilient deflection member to fold in a predetermined direction when said at least one resilient deflection member comes under a force of an impact.

13. An elastically deformable automotive lamp assembly according to claim 12 wherein said means for guiding further comprises an indentation in said at least one resilient deflection member.

14. An elastically deformable automotive lamp assembly according to claim 12 wherein said means for guiding further comprises at least one gusset.

15. An elastically deformable automotive lamp assembly according to claim 12 wherein said means for guiding further comprises a layer member laminated to said at least one resilient deflection member.

16. An elastically deformable lamp assembly, said lamp assembly comprising:
  a housing member having one end and an other end extending in a direction away from said one end;
  a lens member mounted adjacent said housing member; and
  at least one resilient deflection member interposed said lens member and said other end of said housing member, said at least one resilient deflection member having a predetermined yield strength so as to enable a predetermined elastic deformation of said lamp assembly whereby upon impact said at least one resilient deflection member does not exceed said predetermined yield strength of said at least one resilient deflection member so as to return said lamp assembly substantially to its pre-impact position without damage thereto upon removal of the impact force.

17. An elastically deformable automobile lamp assembly for an automotive vehicle having at least one panel member and a movable bumper member spaced a predetermined distance from said at least one panel member, said lamp assembly comprising:
  at least one resilient deflection member attached to said at least one panel member, said at least one resilient deflection member having a predetermined yield strength so as to enable a predetermined elastic deformation of said lamp assembly, whereby upon impact said at least one resilient deflection member provides a degree of resiliency to said lamp assembly such that said lamp assembly may sustain a predetermined elastic deformation upon said lamp assembly being impacted without said at least one resilient deflection member exceeding said predetermined yield strength and return said lamp assembly substantially to its pre-impact position without damage thereto upon removal of the impact force;
  a housing member having one end fixed to said at least one resilient deflection member and an opposite end; and
  a lens member attached to said opposite end of said housing member.

18. An elastically deformable automotive lamp assembly according to claim 17 further comprising an inner lens member attached to at least one of said housing member, said at least one resilient deflection member, and said lens member.

19. In combination with a lamp assembly of the type having a light-permeable lens member, said lens member having a first predetermined form; a housing attached to said lens member, said housing having a second predetermined form; a lamp mounted in said housing; and means for mounting said housing to a mounting surface, said means for mounting having a third predetermined form, the improvement which comprises:
  at least a portion of at least one of said lens member, said housing, and said means for mounting said housing to said mounting surface being resiliently deformable whereby any one of said lens member, said housing and said means for mounting said housing may sustain a yieldable predetermined deformation upon impact and return said respective one of said lens member, said housing, and said means for mounting to said first, second, and third predetermined form, respectively, after impact without impairing said light-permeable characteristics of said lens member of said lamp assembly.

20. A flexible lens member for a lamp assembly, said flexible lens member comprising:
  a light-permeable member having a predetermined form; and
  at least a predetermined portion of said light-permeable member being resiliently deformable whereby said light-permeable member may sustain a yieldable predetermined deformation upon impact and return to said predetermined form after impact without impairing said light-permeable characteristics of said flexible lens member.

21. The flexible lens member as claimed in claim 20 further comprising:
  a housing member having one end attached to said light-permeable member and an opposite end extending in a direction away from said one end; and
  means for fastening said one end of said housing to said light-permeable member.

* * * * *

UNITED STATES PATENT AND TRADEMARK OFFICE
CERTIFICATE OF CORRECTION

PATENT NO.   : 6,331,068 B1
DATED        : December 18, 2001
INVENTOR(S)  : Chase It is certified that error appears in the above-identified patent and that said Letters Patent is hereby corrected as shown below:

Column 1,
Line 52, after "hour" delete "comer" and insert -- corner --.

Column 2,
Line 61, before "bumper" delete "hold" and insert -- hood --.

Column 3,
Line 28, before "impacts" delete "comer" and insert -- corner --.

Column 4,
Line 14, delete the period "." after "vehicle,".

Column 8,
Line 21, delete "an" and insert -- a --.

Column 12,
Line 61, delete the capital "I" and insert the lowercase "L" which is -- l --.
Line 64, after "axis" insert a period -- . --.

Column 16,
Line 9, before "hood" delete -- a --.

Column 17,
Line 12, delete "deflections" and insert -- deflection --.

Signed and Sealed this

Eleventh Day of February, 2003

JAMES E. ROGAN
*Director of the United States Patent and Trademark Office*